United States Patent [19]
Matsumoto et al.

[11] Patent Number: 5,351,089
[45] Date of Patent: Sep. 27, 1994

[54] VIDEO SIGNAL PROCESSING DEVICE AND METHOD

[76] Inventors: Yoshiyuki Matsumoto, Manshon Fukutomi 106, 716-2, Kaminakaimachi, Takasaki-shi; Makoto Furihata, 1186-13, Kamishindenmachi, Maebashi-shi, both of Japan

[21] Appl. No.: 13,376

[22] Filed: Feb. 4, 1993

[30] Foreign Application Priority Data

Feb. 10, 1992 [JP] Japan .................................. 4-57568
Feb. 10, 1992 [JP] Japan .................................. 4-57569

[51] Int. Cl.$^5$ ......................... H04N 9/45; H04N 9/66
[52] U.S. Cl. .................................... 348/497; 348/498; 348/507; 348/505; 348/638; 348/565
[58] Field of Search ............... 358/19, 23, 17, 20, 358/21 R, 22, 22 PIP, 25, 27, 31, 40, 183; 348/638, 639, 641, 497, 498, 499, 500, 505, 506, 507, 508, 564, 565, 566; H04N 9/45, 9/66, 9/455, 9/77, 9/78

[56] References Cited

U.S. PATENT DOCUMENTS

| | | | |
|---|---|---|---|
| 4,463,371 | 7/1984 | Lewis et al. | 358/19 |
| 4,694,326 | 9/1987 | Demmer | 358/19 |
| 4,700,217 | 10/1987 | Balaban et al. | 358/23 |
| 4,712,130 | 12/1987 | Casey | 358/22 PIP |
| 4,750,039 | 6/1988 | Willis | 358/22 PIP |
| 4,992,874 | 2/1991 | Willis et al. | 358/22 PIP |

Primary Examiner—James J. Groody
Assistant Examiner—Michael H. Lee

[57] ABSTRACT

A video signal processing device comprises: a unit for extracting a first color burst signal from a first video signal; a unit for generating a first subcarrier in synchronism with the first color burst signal extracted from the first video signal; a unit for extracting a second chrominance signal and a second color burst signal from a second video signal; a unit for demodulating the second chrominance signal and the second color burst signal on the basis of the first subcarrier to obtain a demodulated second color signal and a demodulated second color burst signal; and an operating unit for performing operation process of the demodulated second color signal on the basis of the demodulated second color burst signal in a manner such that the demodulated second color signal is converted into a corrected color signal which is substantially the same as an imaginal second color signal which is obtained on the assumption that the second chrominance signal is demodulated on the basis of a second subcarrier synchronized with the second color burst signal extracted from the second video signal.

52 Claims, 17 Drawing Sheets

WRITING CYCLE

SERIAL READING CYCLE

VIDEO SIGNAL PROCESSING DEVICE AND METHOD

BACKGROUND OF THE INVENTION

The present invention relates to video signal processing device and method and, more particularly, to a technique which is useful when it is applied to the color reproduction of a color video signal. For instance, the invention can be used in a television receiver, a video reproducing apparatus, or the like.

Recent multi-function television receiver and VCR (video cassette recorder) have two kinds of video signal sources and a function to superimpose a picture (subpicture) of another video signal into a picture (main picture) of one video signal, what is called a PIP (Picture in picture) function. As for the PIP function, for instance, a video signal processing device as disclosed in "Electronic Technique", Vol. May, 1990, pages 42–48, published by The Nikkan Kogyo Shimbun Ltd. is used.

FIG. 16 shows a first constructional example of a PIP system by a conventional video signal processing device. The above PIP system comprises: a main processing system 10 for executing a color process of a video signal forming a main picture; a sub processing system 20 for executing a color process of a video signal forming a subpicture; and a main/subpicture switching portion 30 for superimposing the subpicture into the main picture.

The main processing system 10 comprises: a sync separation circuit 11; a color processing portion 12; a subcarrier generating circuit (APC) 13; a color demodulator 14; and the like. The main processing system 10 separates a chrominance signal $C_p$, a luminance signal $Y_p$, a horizontal synchronizing (or sync) signal $H_p$, and a vertical synchronizing (or sync) signal $V_p$ from the main video signal and generates a subcarrier $f_{sp}$ of 3.58 MHz on the basis of a color burst signal included in a back porch of the horizontal sync signal.

The sub processing system 20 comprises: a sync separation circuit 21; a color processing portion 22; a subcarrier generating circuit (APC) 23; a color demodulator 24; a subpicture control portion 26; a modulator 27; and the like. The sub processing system 20 separates a chrominance signal $C_p$, a luminance signal $Y_c$, a horizontal synchronizing (or sync) signal $H_c$, and a vertical synchronizing (or sync) signal $V_c$, from the sub video signal and generates a subcarrier $f_{sc}$ of 3.58 MHz on the basis of a color burst signal included in a back porch of the horizontal sync signal. The color demodulation is once executed by the subcarrier $f_{sc}$ on the sub processing system side. Demodulated color difference signals (R-Y) and (B-Y) are converted into predetermined picture sizes together with a luminance signal Y by the subpicture control portion 26. The converted color difference signals (R-Y) and (B-Y) are subsequently modulated into the chrominance signal $C_c$ by the subcarrier $f_{sp}$ on the main processing system side.

The main/subpicture switching portion 30 replaces parts of the chrominance signal $C_p$ and luminance signal $Y_p$ from the main processing system 10 to the chrominance signal $C_c$ and luminance signal $Y_c$ from the sub processing system 10 by the switching operation. A chrominance signal C which is switched and generated by the main/subpicture switching portion 30 is demodulated into the color difference signals (R-Y) and (B-Y) the subcarrier $f_{sp}$ on the main processing system side. Consequently, a color synthesized video signal in which the subpicture is superimposed into the main picture, namely, a PIP video signal is obtained.

In the PIP system shown in FIG. 16, the subcarrier generating circuits (APC) 13 and 23 are provided for the main processing system 10 and sub processing system 20, respectively. The chrominance signal $C_c$ on the sub processing system side is once demodulated by the subcarrier $f_{sc}$ on the sub processing system side and, after that, the demodulated signal is subsequently modulated by the subcarrier $f_{sc}$ on the main processing system side, thereby converting the subcarrier $f_{sc}$ of the chrominance signal $C_c$ on the sub side into the subcarrier $f_{sp}$ on the main side. Due to this, the color reproducing processes of the main side video signal and the sub side video signal which are mutually independent can be correctly executed in the same picture.

FIG. 17 shows a second constructional example of a PIP system according to the conventional video signal processing apparatus. In this system, the main processing system 10 and the sub processing system 20 execute the 3-primary color demodulating processes of RGB by the color demodulators 14 and 24 with matrix circuits 15 and 25, respectively. RGB signals ($R_p$, $G_p$, $B_p$) demodulated on the main side are supplied to the main/subpicture switching portion 30 as signals to be selected. RGB signals ($R_c$, $G_c$, and $B_c$) demodulated on the sub side are converted into predetermined picture sizes by the subpicture control portion 26 and, after that, the converted RGB signals are supplied to the switching portion 30 as the other signals to be selected.

The main/subpicture switching portion 30 replaces parts of the RGB signals ($R_p$, $G_p$, $B_p$) on the main side to the RGB signals ($R_c$, $G_c$, $B_c$) on the sub side by the switching operation. By such a switching and selecting operations, a synthesized image signal in which the subpicture is superimposed into the main picture, namely, a PIP video signal can be obtained as a form of the RGB signals.

In the PIP system shown in FIG. 17, the subcarrier generating circuits (APC) 213 and 23 are respectively provided for the main processing system 10 and the sub processing system 20, the chrominance signal on the main side and the chrominance signal on the sub side are independently demodulated to the RGB signals, and the RGB demodulated signals are synthesized. Since the main side and the sub side use the different signal sources, even when the phases of the subcarriers $f_{sp}$ and $f_{sc}$ for demodulation do not correctly coincide, the color reproducing operations of both video signals on the main side and the sub side can be correctly executed in the same picture.

The present inventors, however, have found out that the above technique has the following problems.

That is, in the conventional color signal processing apparatus, as mentioned above, in order to allow the color reproducing operations of the video signals of a plurality of different systems of the signal sources to be correctly executed, it is necessary to provide the subcarrier generating circuit for the color demodulation for every signal system, respectively.

The subcarrier generating circuit, however, must stably continuously generate the subcarrier which is accurately synchronized with a color burst signal inserted in an extremely short interval of the back porch of the horizontal sync signal.

As shown in FIG. 16 or 17, therefore, a quartz-crystal oscillator (Xtal) of a high precision and a capacitor $C_x$ of large capacity are seeded. It is difficult to construct the quartz-crystal oscillator (Xtal) and the capacitor $C_x$ of a large capacity as a semiconductor integrated circuit.

When such a subcarrier generating circuit is provided every signal system, consequently, there occur problems such as enlargement in size of the apparatus due to the difficulty of realization of a semiconductor integrated circuit, high costs due to an increase in number of parts which are externally attached.

In recent years, on the other hand, in a video apparatus such as television receiver, video reproducing apparatus, or the like, in order to improve the picture quality, stabilize the performance, and the like, a digital video signal processing apparatus for digitally processing the color reproduction of the color video signal is often used (for example, refer to "Television Technology", Vol. January, 1990, pages 39–48, published by Densi Gijutsu Shuppan Publishing Ltd.).

In the digital video signal processing apparatus, Y/C separation to separate the luminance signal and the chrominance signals from the video signal, color demodulation to demodulate the color difference signals from the chrominance signals, and the like are executed by digital processes. For the digital processes, the inputted video signal is converted into the digital signal by an A/D converter.

In the conventional apparatus, a clock to decide the sampling timing of the A/D converter and a clock to determine the timing for the digital process such as color demodulation or the like are generated on the basis of the horizontal sync signal of the inputted video signal.

That is, according to the standard color system (NTSC system), the relation between a frequency $f_{sc}$ of the color burst signal (subcarrier) and a frequency $f_h$ of the horizontal sync signal is defined to be constant ($f_{sc}=455\ f_h/2$). Therefore, the clock to decide the sampling timing of the A/D converter and the clock to determine the timing for the digital process such as color demodulation or the like can be commonly formed by a PLL (phase locked loop) which oscillates synchronously with the horizontal sync signal of the inputted video signal. When the clock sources of the digital processing systems for A/D conversion, color demodulation, and the like are uniformed by the horizontal sync signal, generation of a jitter due to a deviation of the sampling phase or the like is prevented, so that it is effective for stabilization of the picture or the like.

The present inventors, however, have found out that the above technique has the following problems.

That is, although the conventional digital video signal processing apparatus is effective to the color video signal of the standard system which is specified so as to obtain a predetermined frequency relation ($f_{sc}=455\ f_h/2$) between the color burst signal and the horizontal sync signal, such an apparatus cannot normally operate for the color video signal of the non-standard system in which the above frequency relation is not always satisfied.

For example, since the video signal which has been received by a television receiver is based on the standard system, the luminance and color information can be accurately and stably reproduced. The video signal derived from a video reproducing apparatus or the like is a non-standard color signal which is slightly deviated from the above frequency relation, so that the color reproduction cannot be correctly executed by the clock synchronized with the horizontal sync signal.

On the other hand, when the sampling clock of the A/D converter is synchronized with the color burst signal in order to accurately perform the color reproduction, a phase error occurs between the sampling timing of the A/D conversion and the horizontal sync signal, so that a jitter in the horizontal direction occurs in the luminance signal.

In the conventional digital video signal processing apparatus, accordingly, two kinds of processing circuits of the digital type and the analog type are provided, the standard color signal is processed by the above digital type, while the non-standard color signal is processed by the conventional analog type.

In this case, however, since the two kinds of digital and analog processing circuits must be provided, the costs of the system rise and a disturbance of the signal such as a skew of picture or the like occurs upon switching of the processing circuits. When the processing circuits are switched, further, it is necessary to judge whether the inputted video signal is the standard or non-standard color signal. There occurs a problem such that a construction to perform such a judgment is fairly complicated and large.

SUMMARY OF THE INVENTION

It is an object of the present invention to provide a technique such that even when a subcarrier generating circuit for color demodulation is not provided for every system, the color reproducing operations of video signals of a plurality of systems can be correctly executed, thereby enabling a picture synthesizing system such as a PIP system to be also constructed at low costs and a small size.

Another object of the invention is to provide a technique which can accurately and stably execute a color reproducing process to any one of standard and non-standard inputted video signals by a single digital processing system without making a construction complicated or making a scale large.

The above and other objects and features of the present invention will become apparent from the following detailed description and the appended claims with reference to the accompanying drawings.

To accomplish the above objects, a video signal processing device according to one aspect of the present invention comprises: a unit for extracting a first color burst signal from a first video signal; a unit for generating a first subcarrier in synchronism with the first color burst signal extracted from the first video signal; a unit for extracting a second chrominance signal and a second color burst signal from a second video signal; a unit for demodulating the second chrominance signal and the second color burst signal on the basis of the first subcarrier to obtain a demodulated second color signal and a demodulated second color burst signal; and an operating unit for performing operation process of the demodulated second color signal on the basis of the demodulated second color burst signal in a manner such that the demodulated second color signal is converted into a corrected color signal which is substantially the same as an imaginal second color signal that is obtained on the assumption that the second chrominance signal is demodulated on the basis of a second subcarrier synchronized with the second color burst signal extracted from the second video signal.

According to the above video signal processing device, the subcarriers for demodulation of the first and second video signal systems can be commonly constructed and the color reproducing processes of both of the signal systems can be correctly executed.

Thus, it is possible to accomplish the object such that the color reproducing processes of the video signals of a plurality of system can be correctly executed without providing the subcarrier generating circuit for color demodulation for every system, thereby enabling a video synthesizing system such as a PIP system to be also constructed at low costs and a small size.

The above video signal processing device may further comprises: a unit for extracting a first chrominance signal from the first video signal; and a unit for demodulating the first chrominance signal on the basis of the first subcarrier to obtain a demodulated first color signal.

The above video signal processing device may further comprise a unit for synthesizing the corrected color signal and the first color signal.

In the above video signal processing device, the unit for generating the first subcarrier may have a single quartz-crystal oscillator.

The operating unit may execute operation which is substantially expressed by the following equations:

$$XC' = -YC \cdot YB + XC \cdot XB$$

$$YC' = XC \cdot YB + YC \cdot XB$$

where,
- XB: Value of a first component indicated by the demodulated second color burst signal
- YB: Value of a second component indicated by the demodulated second color burst signal
- XC: Value of a first component indicated by the demodulated second color signal
- YC: Value of a second component indicated by the demodulated second color signal
- XC': Value of a first component indicated by the corrected color signal
- YC': Value of a second component indicated by the corrected color signal.

In the above video signal processing device, the demodulated second color burst signal may be updated every horizontal period of the second video signal.

The above operating unit may comprises: an averaging unit for sequentially averaging the demodulated second color burst signal derived for a plurality of horizontal periods, every period which is N times as long as the horizontal period (N is an integer of 1 or more); and a unit for performing operation process of the demodulated second color signal on the basis of the signal averaged by the averaging unit in a manner such that the demodulated second color signal is converted into the corrected color signal.

The above video signal processing device may further comprises: a holding unit for sequentially holding the phase information of the second color burst signal every horizontal period; a comparing unit for comparing the phase information held by the holding unit with phase information obtained at the next horizontal period; and a unit for making the corrected color signal ineffective, in response to the result of the comparison by the comparing unit, when a phase difference between the two second color burst signals obtained for two continuous horizontal periods is larger than a predetermined value.

The above video signal processing device may further comprises: a comparing unit for comparing an amplitude of the second color burst signal with a predetermined value; and a unit for making the corrected color signal ineffective, in response to the result of the comparison by the comparing unit, when the amplitude is smaller than the predetermined value.

The above video signal processing device may further comprises: a receiving unit for obtaining the first video signal from a first broadcast signal; and a receiving unit for obtaining the second video signal from a second broadcast signal.

A video signal processing method according to another aspect of the present invention comprises: a step of extracting a first color burst signal from a first video signal; a step of generating a first subcarrier in synchronism with the first color burst signal extracted from the first video signal; a step of extracting a second chrominance signal and a second color burst signal from a second video signal; a step of demodulating the second chrominance signal and the second color burst signal on the basis of the first subcarrier to obtain a demodulated second color signal and a demodulated second color burst signal; and an operating step of performing operation process of the demodulated second color signal on the basis of the demodulated second color burst signal in a manner such that the demodulated second color signal is converted into a corrected color signal which is substantially the same as an imaginal second color signal which is obtained on the assumption that the second chrominance signal is demodulated on the basis of a second subcarrier synchronized with the second color burst signal extracted from the second video signal.

A video signal processing device according to further another aspect of the present invention comprises: an A/D converter for converting an inputted video signal into a digital video signal; a unit for generating a clock synchronized with a horizontal synchronizing signal included in the inputted video signal; a unit for extracting a chrominance signal and a color burst signal from the digital video signal; a unit for demodulating the chrominance signal and the color burst signal on the basis of the clock to obtain a demodulated color signal and a demodulated color burst signal; and an operating unit for performing operation process of the demodulated color signal on the basis of the demodulated color burst signal in a manner such that the demodulated color signal is converted into a corrected color signal which is substantially the same as a second color signal which is obtained in the case where the chrominance signal is demodulated on the basis of the clock synchronized with a color burst signal included in the inputted video signal.

According to the above video signal processing device, with the above means, even when there is a phase error between the clock which is generated synchronously with the horizontal sync signal of the inputted video signal and a color burst signal of the inputted video signal, a color demodulation error which is caused by such a phase error can be automatically corrected on the basis of the phase difference between the color burst signal and the clock CK. Consequently, it is possible to accomplish the object such that the color reproducing process is accurately and stably executed to any of the standard and non-standard inputted video signals by a signal digital processing system without making a construction complicated or making a scale large.

The operating unit may execute operation which is substantially expressed by the following equations:

$$XC' = -YC \cdot YB + XC \cdot XB$$

$$YC' = XC \cdot YB + YC \cdot XB$$

where,
XB: Value of a first component indicated by the demodulated color burst signal
YB: Value of a second component indicated by the demodulated color burst signal
YC: Value of a second component indicated by the demodulated color signal
XC: Value of a first component indicated by the demodulated color signal
XC': Value of a first component indicated by the corrected color signal
YC': Value of a second component indicated by the corrected color signal.

The demodulated color burst signal may be updated every horizontal period of the video signal.

The above operating unit may comprises: an averaging unit for sequentially averaging the demodulated color burst signal derived for a plurality of horizontal periods, every period which is N times as long as the horizontal period (N is an integer of 1 or more); and a unit for performing operation process of the demodulated color signal on the basis of the signal averaged by the averaging unit in a manner such that the demodulated color signal is converted into the corrected color signal.

The above video signal processing device may further comprises: a holding unit for sequentially holding the phase information of the color burst signal every horizontal period; a comparing unit for comparing the phase information held in the holding unit with phase information obtained at the next horizontal period; and a unit for making the corrected color signal ineffective, in response to the result of the comparison by the comparing unit, when a phase difference between the two color burst signals obtained for two continuous horizontal periods is larger than a predetermined value.

The above video signal processing device may further comprises: a comparing unit for comparing an amplitude of the second color burst signal with a predetermined value; and a unit for making the corrected color signal ineffective, in response to the result of the comparison by the comparing unit, when the amplitude is smaller than the predetermined value.

The above video signal processing device can also further comprise: a modulating unit for modulating the corrected color signal into the chrominance signal by a clock which is generated on the basis of the color burst signal included in the inputted video signal.

The above video signal processing device can also further comprise a modulating unit for modulating the corrected color signal into the chrominance signal by the clock.

A video signal processing method according to further another aspect of the present invention comprises: a step of converting an inputted video signal into a digital video signal; a step of generating a clock synchronized with a horizontal synchronizing signal included in the inputted video signal; a step of extracting a chrominance signal and a color burst signal from the digital video signal; a step of demodulating the chrominance signal and the color burst signal on the basis of the clock to obtain a demodulated color signal and a demodulated color burst signal; and an operating step of performing operation process of the demodulated color signal on the basis of the demodulated color burst signal in a manner such that the demodulated color signal is converted into a corrected color signal which is substantially the same as a second color signal which is obtained in the case where the chrominance signal is demodulated on the basis of the clock synchronized with a color burst signal included in the inputted video signal.

A video signal processing device according to further another aspect of the present invention comprises: a unit for receiving a first signal indicative of a first component of a color burst signal; a unit for receiving a second signal indicative of a second component of the color burst signal; a unit for receiving a third signal indicative of a first component of a color signal; a unit for receiving a fourth signal indicative of a second component of the color signal; and an operating unit for performing operation process of the first to fourth signals to obtain a fifth signal indicative of a first component of a corrected color signal and a sixth signal indicative of a second component of the corrected color signal. In this case, the operating unit executes operation which is substantially expressed by the following equations:

$$XC' = -YC \cdot YB + XC \cdot XB$$

$$YC' = XC \cdot YB + YC \cdot XB$$

where,
XB: Value indicated by the first signal
YB: Value indicated by the second signal
XC: Value indicated by the third signal
YC: Value indicated by the fourth signal
XC': Value indicated by the fifth signal
YC': Value indicated by the sixth signal.

The above video signal processing device can be used in each of the foregoing video signal processing devices and methods.

A video signal processing method according to further another aspect of the present invention comprises: a step of receiving a first signal indicative of a first component of a color burst signal; a step of receiving a second signal indicative of a second component of the color burst signal; a step of receiving a third signal indicative of a first component of a color signal; a step of receiving a fourth signal indicative of a second component of the color signal; and an operating step of performing operation process of the first to fourth signals to obtain a fifth signal indicative of a first component of a corrected color signal and a sixth signal indicative of a second component of the corrected color signal. In this case, the operating step includes a step to execute operation which is substantially expressed by the following equations:

$$XC' = -YC \cdot YB + XC \cdot XB$$

$$YC' = XC \cdot YB + YC \cdot XB$$

where,
XB: Value indicated by the first signal
YB: Value indicated by the second signal
XC: Value indicated by the third signal YC: Value indicated by the fourth signal
XC': Value indicated by the fifth signal
YC': Value indicated by the sixth signal.

DESCRIPTION OF THE PREFERRED EMBODIMENTS

Figure 1:
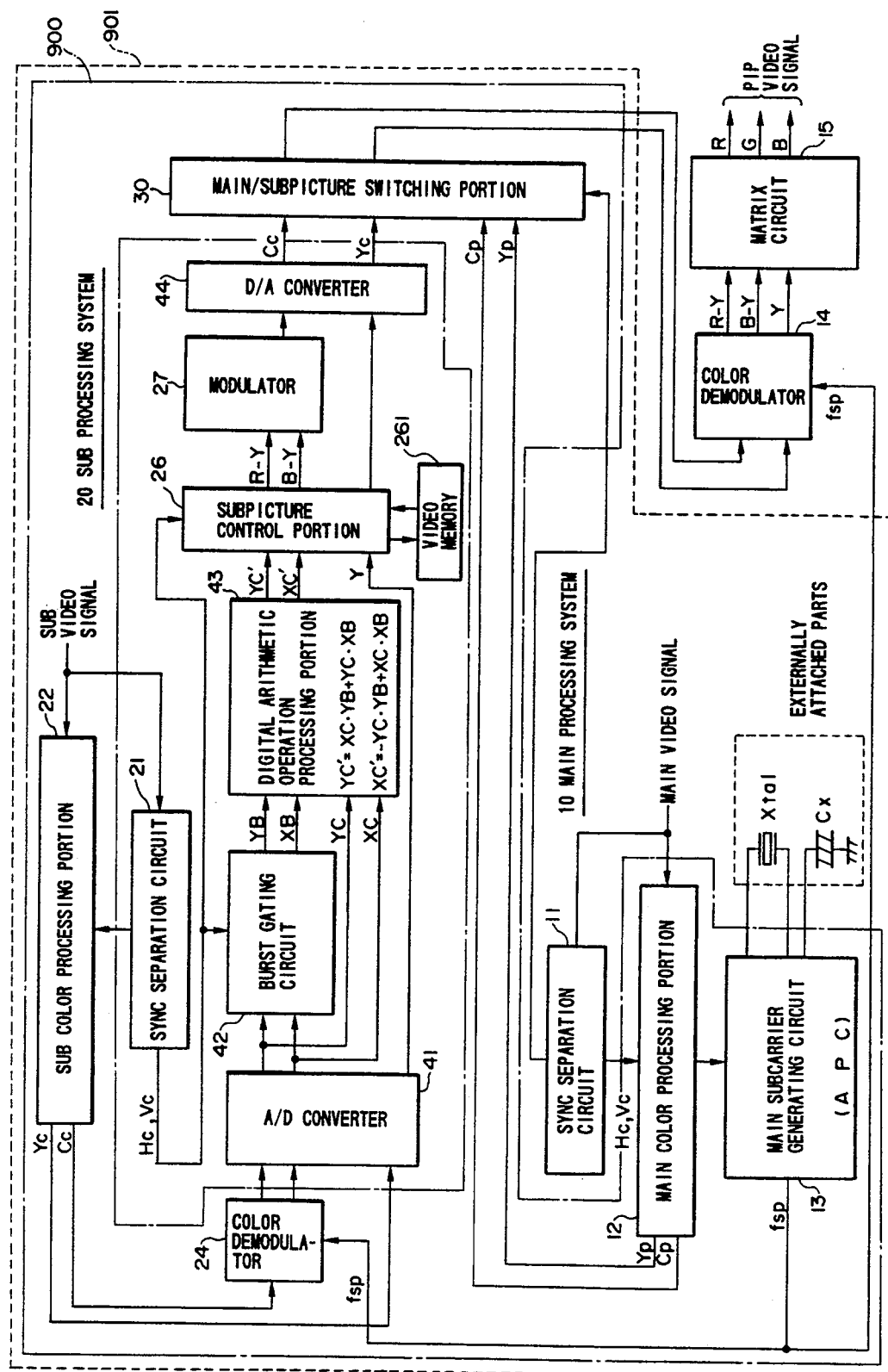
FIG. 1 is a block diagram showing a video signal processing device according to an embodiment of the present invention.

Video signal processing device and method according to the present invention will now be described hereinbelow with reference to the drawings.

In each diagram, it is assumed that the same or corresponding portions are designated by the same reference numerals.

FIG. 1 shows the first embodiment of a video signal processing device to which the technique of the present invention is applied.

The video signal processing device shown in FIG. 1 is used in the PIP system to reduce a picture of the second video signal system and superimpose into a picture of the first video signal system. In a manner similar to the foregoing conventional system, the above PIP system fundamentally comprises: the main processing system 10 to perform a color process of a video signal forming the main picture; the sub processing system 20 to execute a color process of a video signal forming the subpicture; and the main/subpicture switching portion 30 to superimpose the subpicture into the main picture.

Figure 2:
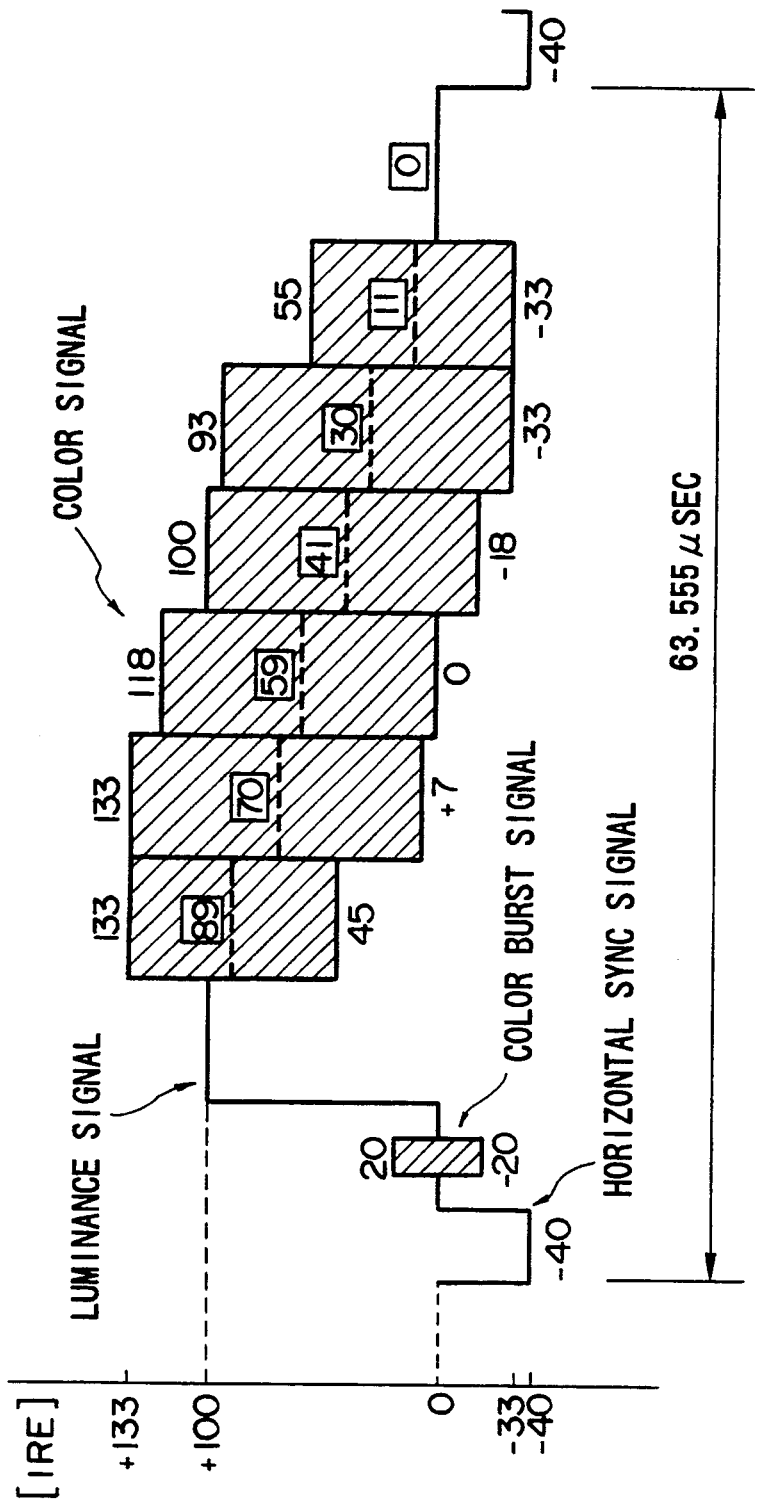
FIG. 2 is a diagram showing an example of the video signal.

FIG. 2 shows a waveform diagram of a color-bar signal as an example of the video signal. IRE of an axis of ordinate in FIG. 2 indicates an Institute of Ratio Engineers and there is a relation of 1 V=140 IRE units.

In FIG. 1, first, the main processing system 10 comprises: the sync separation circuit 11; the color processing portion 12 including a burst separating circuit, an ACC circuit, and the like; the subcarrier generating circuit (APC) 13; the color demodulator 14; the matrix circuit 15; and the like. The main processing system 10 separates the chrominance signal $C_p$, luminance signal $Y_p$, horizontal sync signal $H_p$, and vertical sync signal $V_p$ from the main video signal and generates the subcarrier $f_{sp}$ of 3.58 MHz on the basis of the color burst signal included in the back porch of the horizontal sync signal.

The sub processing system 20 comprises: the sync separation circuit 21; the color processing portion 22 including a burst separating circuit, an ACC circuit, and the like; the color demodulator 24; an A/D converter 41; a burst getting circuit 42; a digital arithmetic operation processing portion 43; the subpicture control portion 26; a video memory 261 to form a subpicture; the modulator 27; a D/A converter 44; and the like. The sub processing system 20 separates the chrominance signal $C_c$, luminance signal $Y_c$, horizontal sync signal $H_c$, and vertical sync signal $V_c$ from the sub video signal and executes a color demodulating process, a correcting process by an arithmetic operation, and a subpicture control as will be explained hereinlater.

In the above case, the sub processing system 20 doesn't have a subcarrier generating circuit and the color demodulation by the color demodulator 24 is executed by the subcarrier $f_{sp}$ of 3.58 MHz which is generated by the subcarrier generating circuit 13 of the main processing system 10. The color difference signals (color difference signals including the color burst signal) (R-Y) and (B-Y) demodulated by the subcarrier $f_{sp}$ on the main side are converted into the digital signals together with the luminance signal $Y_c$ or the like. The digital converted color difference signals (R-Y) and (B-Y) are divided into color burst signals YB and XB in an interval of the color burst signal of the sub side video signal and color difference signals (color difference signals including no color burst signal) YC and XC in the whole interval by the burst gating circuit 42 and are supplied to the digital arithmetic operation processing portion 43, respectively.

Figure 3:
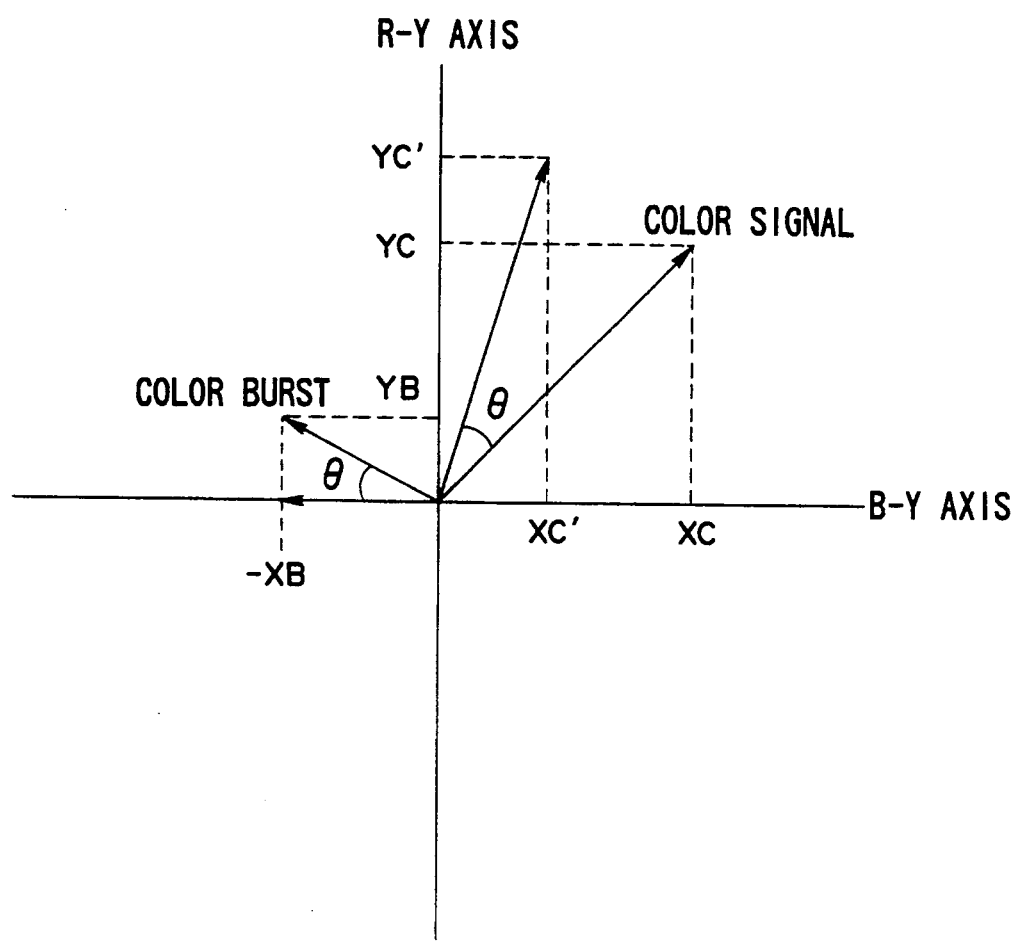
FIG. 3 is a vector diagram showing an example of arithmetic operating processes.

As shown in FIG. 3, the digital arithmetic operation processing portion 43 obtains $\sin \theta$ and $\cos \theta$ regarding a phase difference $\theta$ between the sub side color burst signal and the main side subcarrier $f_{sp}$ on the basis of the signal values (R-Y axis component value, B-Y axis component value) of the color burst signals YB and XB in the color burst interval. The obtained $\sin \theta$ and $\cos \theta$ are held until $\sin \theta$ and $\cos \theta$ in the next color burst interval are obtained. Further, the processing portion 43 executes arithmetic operating processes to mathematically correct the color difference signals YC and XC in the whole interval so as to become color difference signals YC' and XC' such as to eliminate the phase difference $\theta$. That is, the digital arithmetic operation processing portion 43 performs arithmetic operation processes of the color difference signals YC and XC on the basis of the color burst signals YB and XB in a manner such that the digital color difference signals YC and XC are converted into the corrected color difference signals YC' and XC' which are substantially the same as imaginal color difference signals which are obtained on the assumption that the chrominance signal $C_c$ was demodulated on the basis of a subcarrier synchronized with a color burst signal extracted from the sub side video signal.

The following equations show an example of arithmetic operating equations which are executed by the arithmetic operation processing portion 43.

$$YC' = XC \cdot YB + YC \cdot XB \brace XC' = -YC \cdot YB + XC \cdot XB \quad (1)$$

$$YC' = XC \sin\theta + Y \cos\theta \brace XC' = YC \sin\theta + XC \cos\theta \quad (2)$$

$$\sin\theta = YB \brace \cos\theta = XB \quad (3)$$

$$32 \ (LSB) \cdot \frac{40 \ (IRE)}{126 \ (IRE)} \approx 10.16 \ (LSB) \quad (4)$$

The corrected color difference signals YC' and XC' on the sub side obtained by the correcting processes due to the arithmetic operations are sent to the subpicture control portion 26 together with the luminance signal Y and are converted into a predetermined picture size.

The subpicture control portion 26 executes a converting process such as reduction of the image size or the like by using the video memory 261. The color difference signal on the sub side which has been subjected to the size converting process by the subpicture control portion 26 is modulated into the chrominance signal by the subcarrier $f_{sp}$ on the main side and, after that, it is converted together with the luminance signal Y into the analog signals ($C_c$, $Y_c$) and sent to the main/subpicture switching portion 30.

The switching portion 30 replaces parts of the chrominance signal $C_p$ and luminance signal $Y_p$ from the main processing system 10 to the chrominance signal $C_c$ and luminance signal $Y_c$ from the sub processing system 20 by the switching operation. The chrominance signal C and luminance signal Y which are generated by the switching and selecting operations are demodulated into the RGB color signals by the subcarrier $f_{sp}$ on the main side. Thus, a color synthesized video signal in which the subpicture is superimposed into the main picture, namely, a PIP video signal is derived.

In the above video signal processing device, the subcarrier generating circuit (APC) 13 which needs a quartz-cristal oscillator (Xtal) of a high precision and a capacitor $C_x$ of a large capacity is provided only on the main side and the chrominance signal $C_c$ on the sub side is demodulated by using the subcarrier $f_{sp}$ on the main side. Therefore, the subcarrier $f_{sp}$ on the main side is obviously not synchronized with the color burst signal on the sub side. Therefore, unless the arithmetic operation processing portion 43 is provided, the color reproduction on the sub side is not correctly executed.

As shown in FIG. 3, however, by executing a correction arithmetic operating process such as to eliminate the phase difference $\theta$ between the color burst signal on the sub side and the subcarrier $f_{sp}$ on the main side, the color difference signals YC and XC which were demodulated on the sub side are corrected to the color difference signals YC' and XC' having the same phase angle as that in the case where they were demodulated by the subcarrier of the same phase as that of the color burst signal on the sub side. Further, a reference phase which is used to perform such a correction is updated every horizontal synchronizing interval as an input interval of the color burst signal.

Thus, even when the phases of the subcarriers of the chrominance signals of the video signal system on the main side and the video signal system on the sub side are different, the color reproducing processes of both of those signal systems can be correctly executed. Therefore, the color reproducing processes of the video signals of a plurality of systems can be correctly executed without providing the subcarrier generating circuit which needs the quartz-crystal oscillator (Xtal) of a high precision and the capacitor $C_x$ of a large capacity for every signal system, and the video synthesizing system such as a PIP system can be also constructed at low costs and a small size.

In FIG. 1, the component elements in a portion 900 surrounded by an alternate long and short dash line are built in a first IC and the video memory 261 constructs a second IC. The component elements in a portion 901 surrounded by a broken line excluding the component elements built in the first IC and the video memory 261 and the externally attached parts are built in a third IC. The component elements in the portion 901 surrounded by the broken line in FIG. 1 are installed on one printed circuit board.

Figure 4:
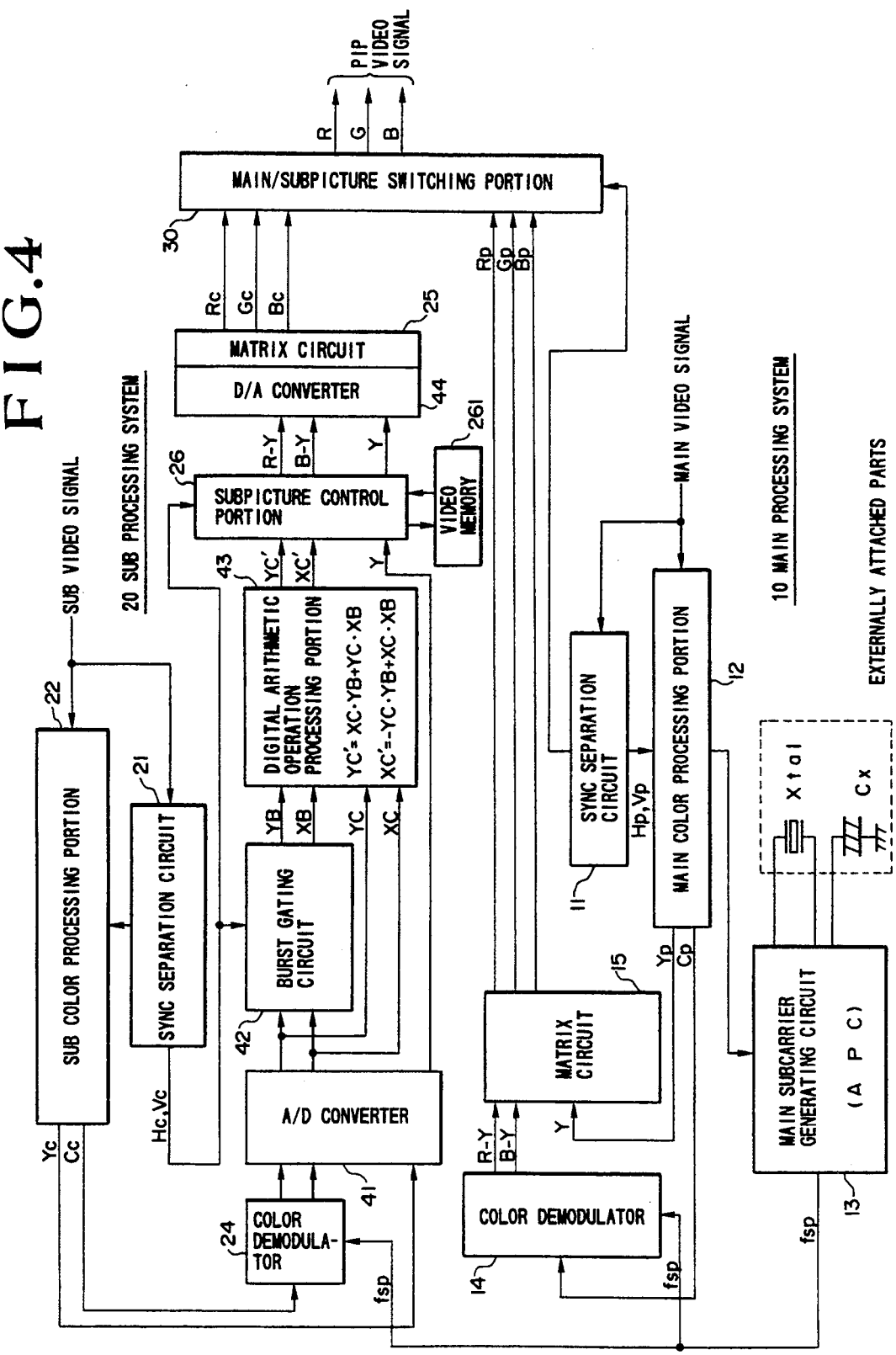
FIG. 4 is a block diagram showing a video signal processing device according to another embodiment of the present invention.

FIG. 4 shows the second embodiment of a video signal processing device to which the technique of the present invention is applied.

The device shown in FIG. 4 also constructs a PIP system. Explanation will now be made by paying an attention to a point different from the first embodiment mentioned above. In the second embodiment, the main processing system 10 and the sub processing system 20 execute the three-primary color demodulations of RGB by the color demodulators 14 and 24 with the matrix circuits 15 and 25, respectively. The RGB signals ($R_p$, $G_p$, $B_p$) demodulated on the main side are supplied to the main/subpicture switching portion 30 as signals to be selected. The RGB signals ($R_c$, $G_c$, $B_c$) demodulated on the sub side are converted into predetermined picture sizes by the subpicture control portion 26 and, after that, they are supplied to the switching portion 30 as the other signals to be selected. The switching portion 30 replaces parts of the RGB signals ($R_p$, $G_p$, $B_p$) on the main side to the RGB signals ($R_c$, $G_c$, $B_c$) on the sub side by the switching operation. A synthesized video signal in which the subpicture has ben superimposed into the main picture, namely, a PIP video signal can be obtained in a form of the RGB signals by the switching and selecting operation.

Only one subcarrier generating circuit 13 to execute the color demodulation is provided on the main side and is not provided on the sub side. Both of the color demodulations on the main side and sub side are executed by the main side subcarrier $f_{sp}$ which is generated by the subcarrier generating circuit 13 on the main side synchronously with the color burst signal on the main side. Therefore, in this state, the color reproduction on the sub side is not correctly executed.

In the second embodiment as well, however, in a manner similar to the first embodiment mentioned above, a correction arithmetic operating process such as to eliminate the phase difference θ between the sub side color burst signal and the main side subcarrier $f_{sp}$ is executed by the A/D converter 41, burst gating circuit 42, digital arithmetic operation processing portion 43, and D/A converter 44. The color difference signals YC and XC demodulated on the sub side are corrected so as to become the color difference signals YC' and XC' having the same phase angle as that in the case where they were demodulated by the subcarrier of the same phase as that of the sub side color burst signal.

Consequently, even when the phases of the subcarriers of the chrominance signals of the main side video signal system and the sub side video signal system are different, the color reproducing processes of both of the signal systems can be correctly executed.

Figure 5:
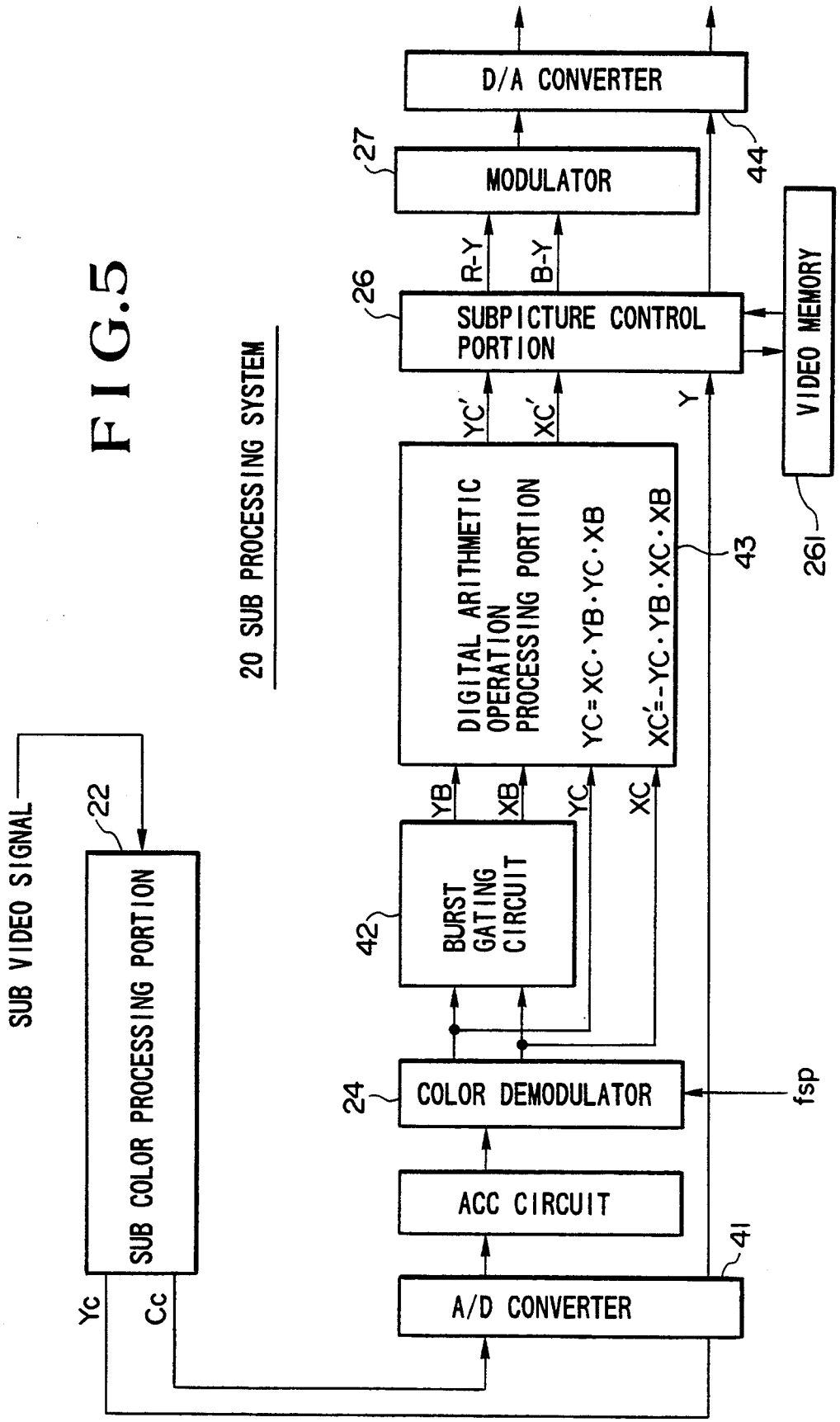
FIG. 5 is a block diagram showing a main section of a video signal processing device according to still another embodiment of the invention.

FIG. 5 shows only a main section of the third embodiment of a video signal processing device to which the technique of the present invention is applied. In the third embodiment, a digital processing type is used as a color demodulator 24 and, after the sub side chrominance signal $C_c$ was converted into the digital signal by the D/A converter 41, the color demodulation is executed.

Even by the third embodiment as well, by executing a correction arithmetic operating process such as to eliminate the phase difference θ between the color burst signal on the sub side and the subcarrier $f_{sp}$ on the main side, even when the phases of the subcarriers of the chrominance signals of the main side video signal system and the sub side video signal system are different, the color reproducing processes of both of the signal systems can be correctly executed.

The device shown in FIG. 1 can be also modified as shown in FIG. 5. The device shown in FIG. 4 can be also modified as shown in FIG. 5.

Figure 6:
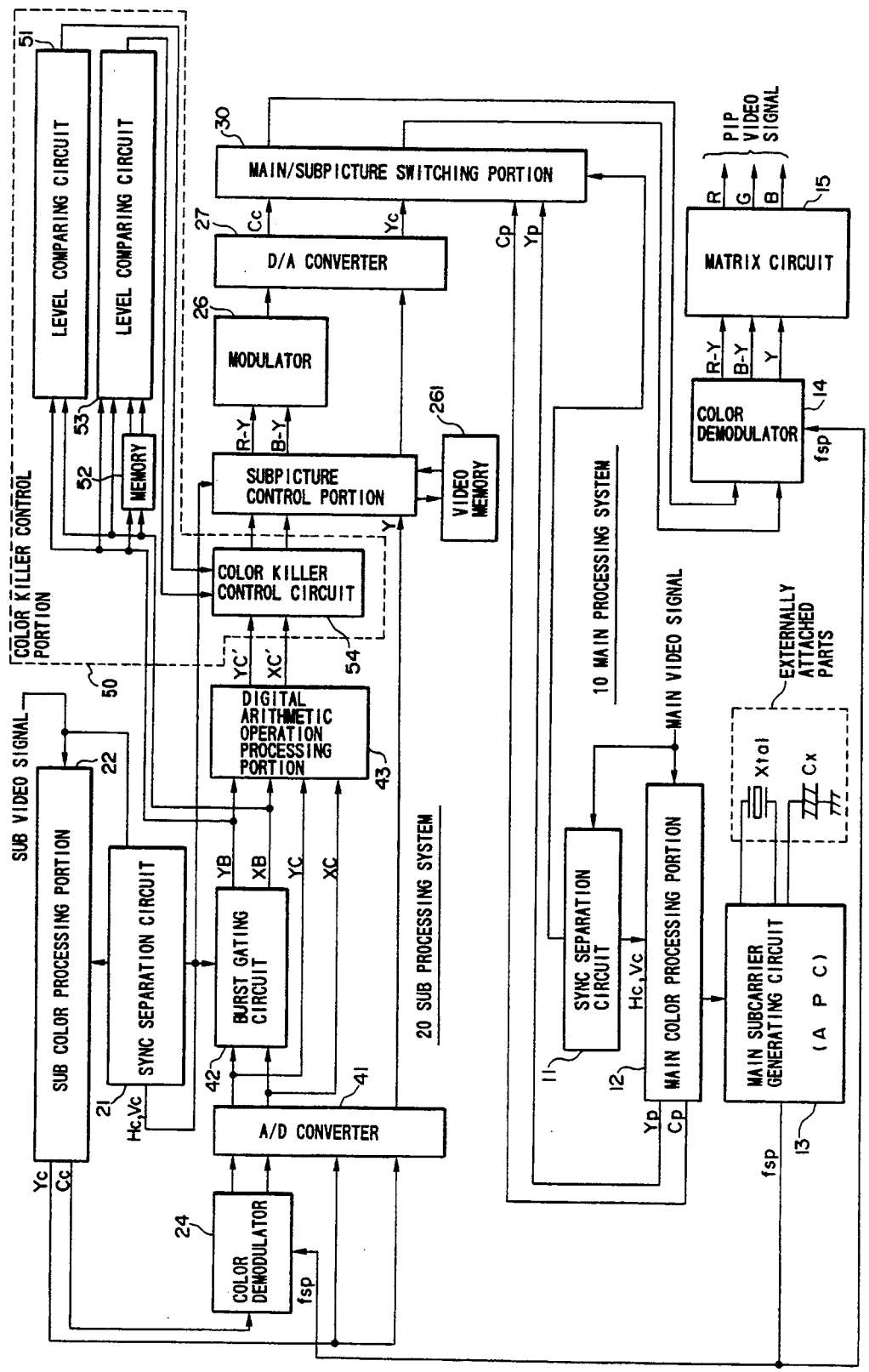
FIG. 6 is a block diagram showing a video signal processing device according to further another embodiment of the invention.
Figure 7:
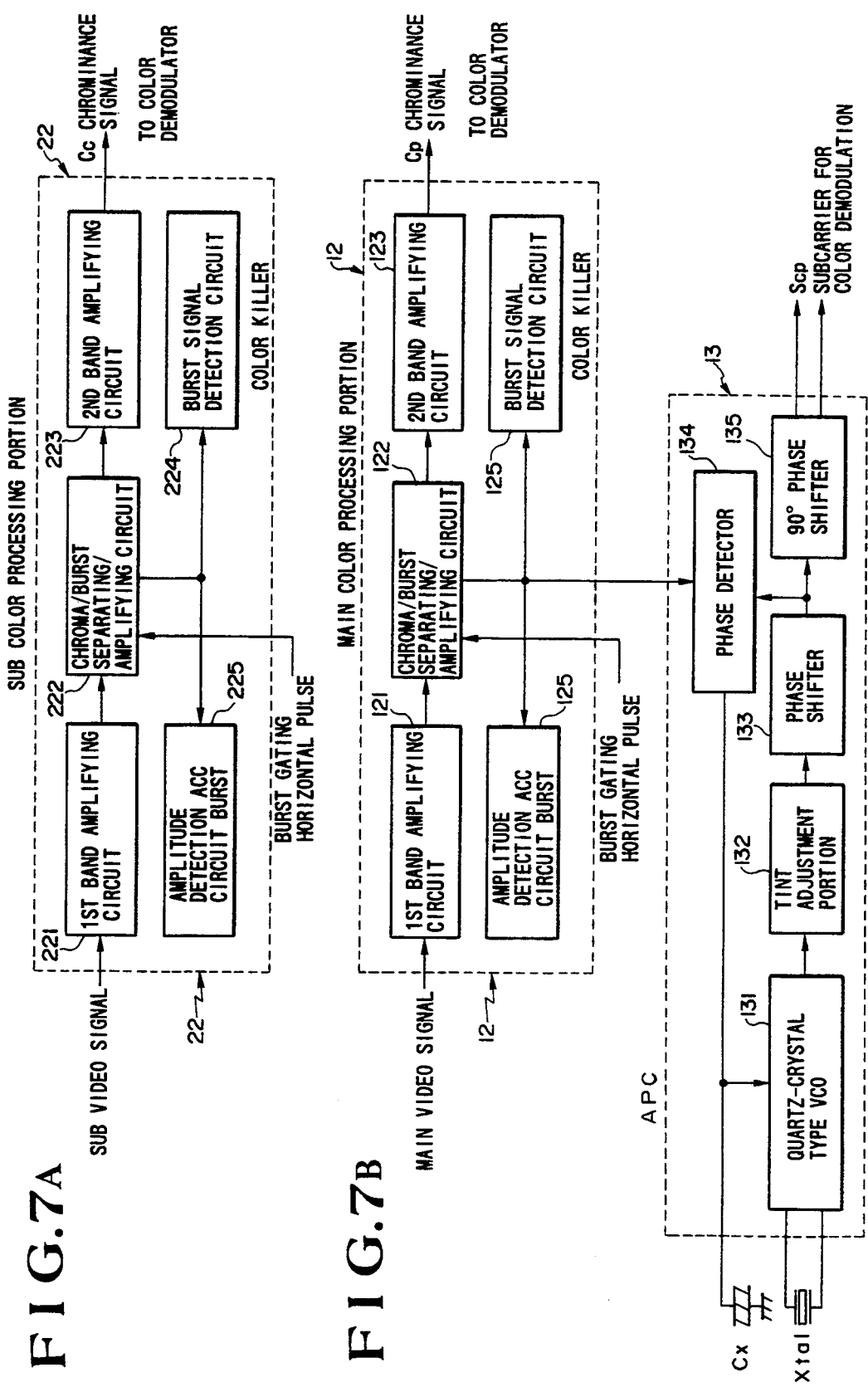
FIG. 7A is a block diagram showing an example of a subpicture color signal processing portion.
FIG. 7B is a diagram showing a main picture color signal processing portion and a subcarrier generating circuit.

FIG. 6 shows the fourth embodiment of a video signal processing device to which the technique of the present invention is applied.

A comparison between the fourth embodiment and the first embodiment shown in FIG. 1 will now be described. In the fourth embodiment, a color killer control portion 50 to execute a color killer control on the basis of the color demodulation outputs (YB, XB) of the sub side color burst signal is added. The control portion 50 has the following two kinds of color killer control functions.

That is, the first color killer control function is constructed by using a level comparing circuit 51. The color burst signals YB and XB are compared with a set value. When both of YB and XB are equal to or less than the set value, the color difference signals are made ineffective by a color killer control circuit 54. That is, the transfer of the color difference signals are inhibited and therefore signals having colorless level are outputted. Due to this, a color noise in case of a black and white video can be automatically suppressed.

According to the second color killer control function, the phase information of the color burst signal included in the horizontal sync signal of the video signal is held, the held phase information is compared with the phase information of the color burst signal included in the next horizontal sync signal, and when the phase difference between both of the color burst signals is equal to or larger than a predetermined value, the demodulation of the color signal is made ineffective.

Practically speaking, as shown in FIG. 6, the above function is constructed by using a memory (latch circuit) 52 and a level comparing circuit 53. The color difference signals YB and XB which are demodulated from the color burst signal are held every horizontal sync signal. The held color difference signals YB and XB are compared with the color burst signals BY and XB which are demodulated by the next horizontal sync signal. When a difference between both of the signals is equal to or larger than a predetermined value, the transfer of the color difference signals is inhibited by the color killer control circuit 54.

Thus, a color noise occurring when the system of the video signal is other than the standard system (NTSC system) can be automatically suppressed. That is, the color system is automatically checked.

FIGS. 7A to 12B show detailed constructional examples of the respective portions in each device according to the embodiments of the present invention mentioned above.

FIGS. 7A and 7B show detailed constructional examples of the color processing portions 12 and 22 and the subcarrier generating circuit 13.

The main side color processing portion 12 and the sub side color processing portion 22 have first band amplifying circuits 121 and 221, chroma/burst separating/amplifying circuits 122 and 222, second band amplifying circuits 123 and 223, burst signal detection circuits 124 and 224, ACC (automatic chroma control) circuits 125 and 225, and the like, respectively.

The subcarrier generating circuit (APC) 13 generates the subcarrier $f_{sp}$ synchronously with the color burst signal which is separated from the color processing portion 12 on the main side by a PLL loop comprising a VCO (voltage controlled oscillator) 131 of the quartz-crystal oscillating type, a tint adjustment part 132, a phase shifter 133, and a phase detector 134. The subcarrier $f_{sp}$ is generated as a two-phase signal having a phase difference of 90° by a 90° phase shifter 135 and is distributed to the color demodulators on the main side and sub side.

Figure 8:
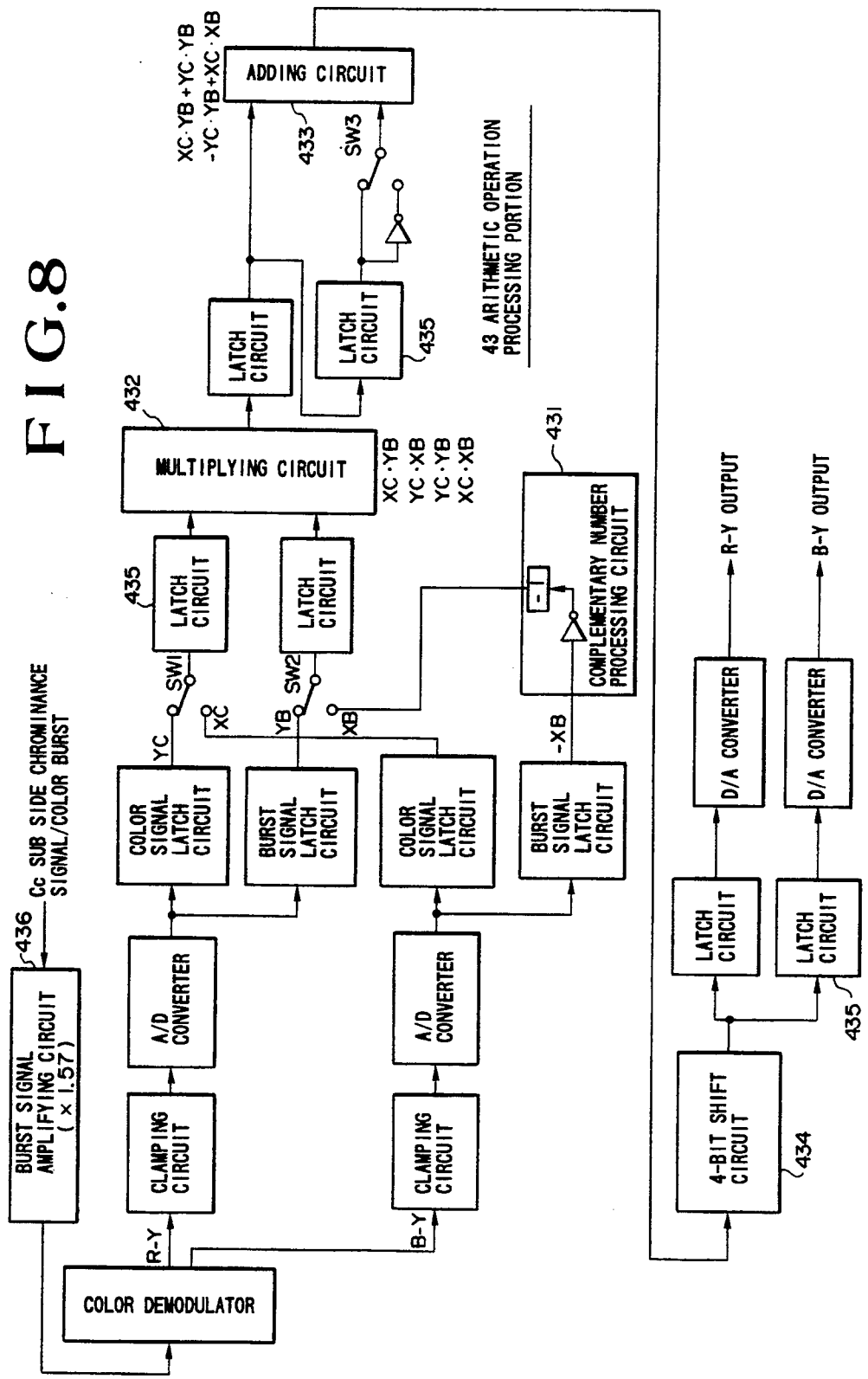
FIG. 8 is a block diagram showing an example of a digital arithmetic operation processing portion.

FIG. 8 shows a detailed constructional example of the digital arithmetic operation processing portion 43.

The arithmetic operation processing portion shown in the diagram executes the correction arithmetic operations of the above equations (1) to (4) by a complementary number processing circuit 431, a multiplying circuit 432, an adding circuit 433, a 4-bit shift circuit 434 to perform a 1/16 division, a data latch circuit 435, a burst signal amplifying circuit 436, data change-over switches $SW_1$, $SW_2$, and $SW_3$, and the like.

In the equations (1), (2) and (3), an amplitude of the color burst signal is set to 1. When the amplitude of color burst signal is set to an arbitrary value other than 1, a coefficient corresponding to such an arbitrary value is multiplied to the equation (3).

In the video signal of the standard system (NTSC system), the maximum value of the color signal amplitude is set to 126 IRE (Institution Ratio Engineers) of cyan or red. Therefore, the maximum value 126 IRE is specified to the full dynamic range of the A/D converter. For example, in case of using an A/D converter of six bits, since the most significant bit (MSB) is used as a code bit, the maximum amplitude level becomes 64 LSB (1 LSB=minimum quantization unit).

Since the value of the color burst signal is set to 40 IRE, the maximum amplitude level is set to 20.32 LSB by the equation (4) for the above 764 LSB.

In the equations (1) to (3), since the amplitude of the color burst signal is set to 1, it is necessary to divide the result of the arithmetic operation of the equation (1) by 20.32. Such a division can be easily executed by only the bit-shift process of five or six bits by constructing in a manner such that the color burst signal is previously amplified by 1.57 times so as to obtain the quantization level of 32 LSB or the color burst signal is previously amplified by 3.14 times so as to obtain the quantization level of 64 LSB.

The digital arithmetic operation processing portion 43 may be constructed in a software manner by using a DSP (digital signal processor) or the like.

Figure 9:
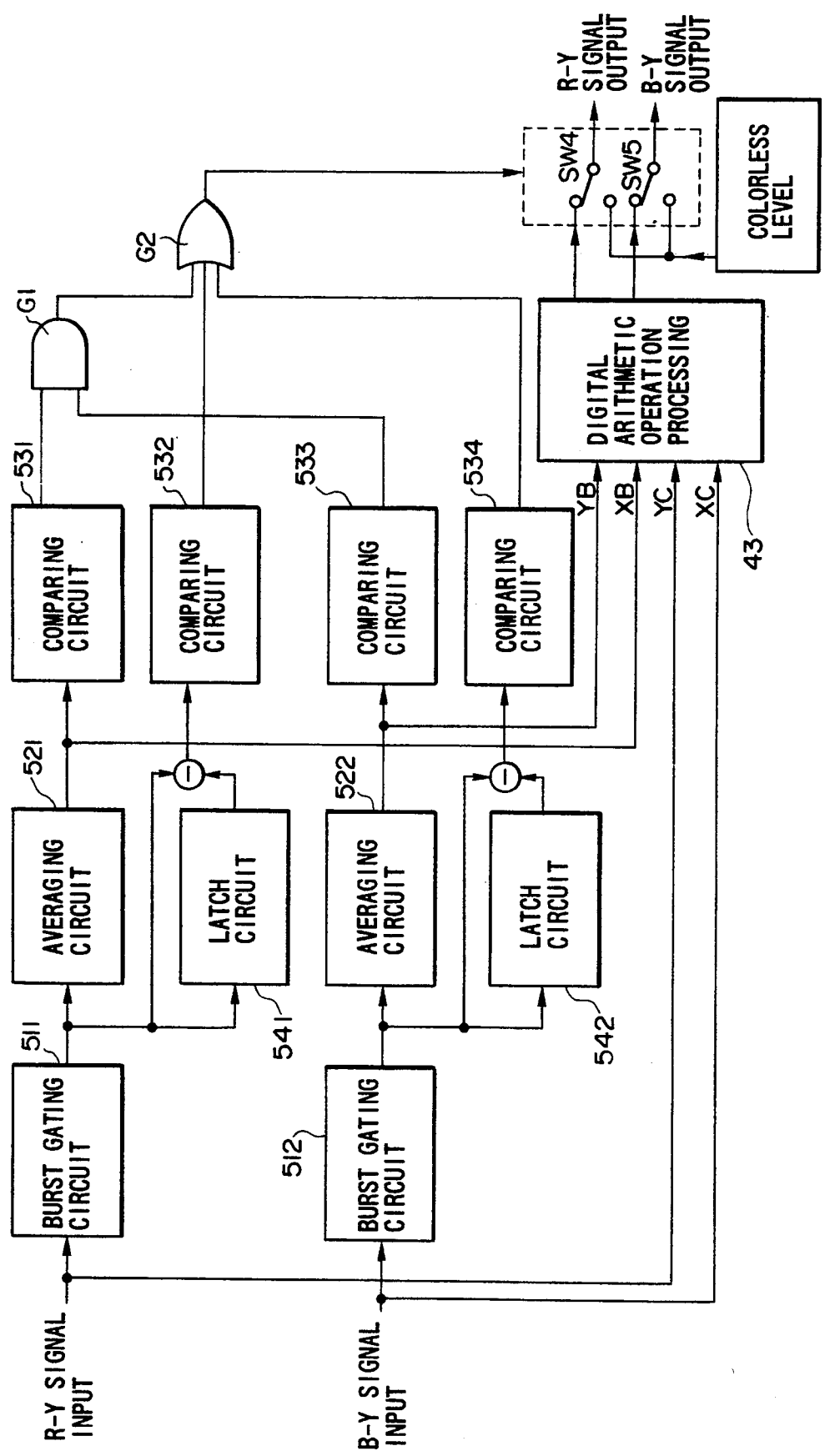
FIG. 9 is a block diagram showing an example of a color killer control portion.

FIG. 9 shows a detailed constructional example of a circuit to execute the color killer control. Such a circuit can be replaced to the color killer control portion 50 shown in FIG. 6 and used.

In FIG. 9, as for the R-Y signal and B-Y signal which are supplied from the color demodulators, only the signals from the color burst interval are extracted by burst gating circuits 511 and 512, respectively, and amplitude levels are averaged by averaging circuits 521 and 522. Such an averaging process is performed to prevent that a quantization error of the color burst signal appears every horizontal synchronizing interval. Outputs of the averaging circuits 521 and 522 are sent to comparing circuits 531 and 533.

Each of the comparing circuits 531 and 533 compares the lower order bit of the averaged output and a predetermined value and generates a logic control signal (high level) to execute the color killer control when the amplitude level of the averaged output is smaller than the reference value. In such a case, by allowing the comparing operations of the comparing circuits 531 and 533 to have slight hystereses, it is possible to prevent that the killer control operation becomes unstable due to a micro fluctuation of the amplitude level of the comparison input, namely, the input signal which has been averaged.

On the other hand, as for the R-Y signal and B-Y signal (color burst signals) which were extracted from the color burst interval and supplied, differences, of them between the preceding color burst interval and the present color burst interval are obtained by latch circuits 541 and 542 and are sent to comparing circuits 532 and 534.

Each of the comparing circuits 532 and 534 compares the level of the above difference and a predetermined reference value and generates a logic control signal (high level) to execute the color killer control when the difference level is larger than the reference value.

The above difference level reflects a magnitude of the phase change of the color burst signal which is caused for a period of time from the preceding horizontal scan to the present horizontal scan. When the phase change of the color burst signal which is reflected to the difference level is larger than a reference value, it is determined that the color burst signal is not the color burst signal of the standard system (NTSC system), so that the logic control signal (high level) to execute the color killer control is generated.

The output signals of the comparing circuits 531 to 534 are sent as control signals to data change-over switches SW4 and SW5 through logic gates G₁ and G₂. By the logic operations of the logic gates G₁ and G₂, the switching operations of the data change-over switches SW4 and SW5 are controlled when both of the output signals of the comparing circuits 531 and 532 to detect the amplitude levels of the color burst signals are set to the high level or when either one of the output signals of the comparing circuits 532 and 534 to detect the difference levels of the color burst signals is set to the high level. Color difference signal outputs (R-Y, B-Y) which are transferred to the post stage are switched to the black and white colorless level.

Figure 10:
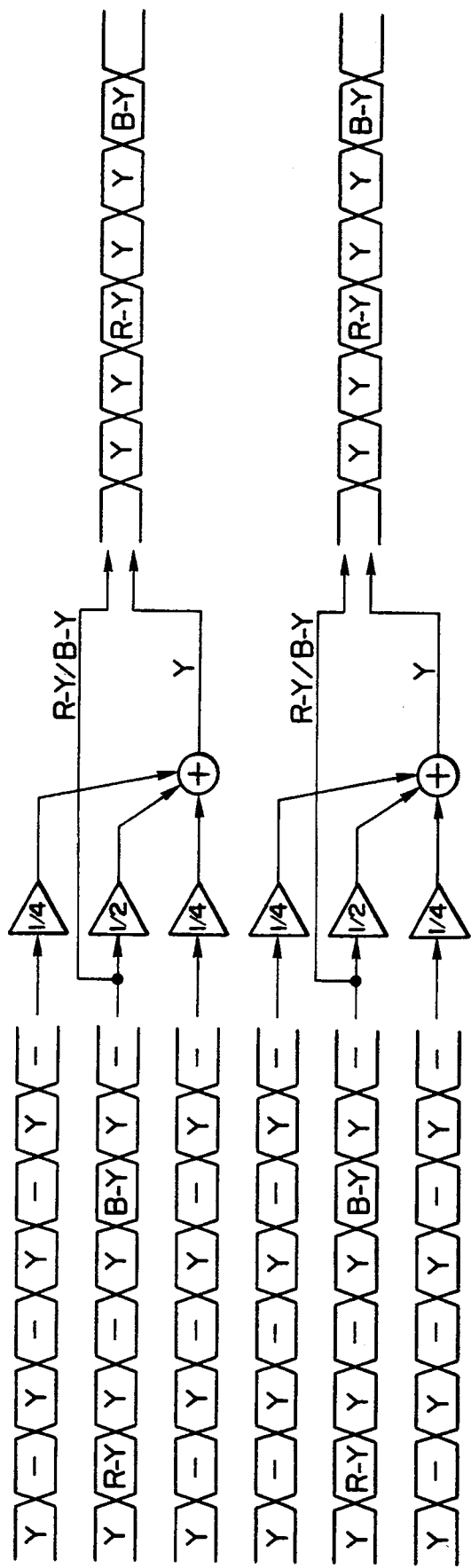
FIG. 10 is a diagram showing an example of a reduction processing system due to the sampling of pixels.

FIG. 10 shows an example of a reduction processing system due to the sampling of pixels.

The reducing process is executed in the two-dimensional directions of the vertical and horizontal scanning directions. As for the luminance signal, the luminance levels of a plurality of adjacent pixels are averaged to one pixel, thereby performing the reducing process. With respect to the color difference signals (R-Y, B-Y), by sampling the pixels at a predetermined pixel interval, the reducing process is performed.

Figure 11:
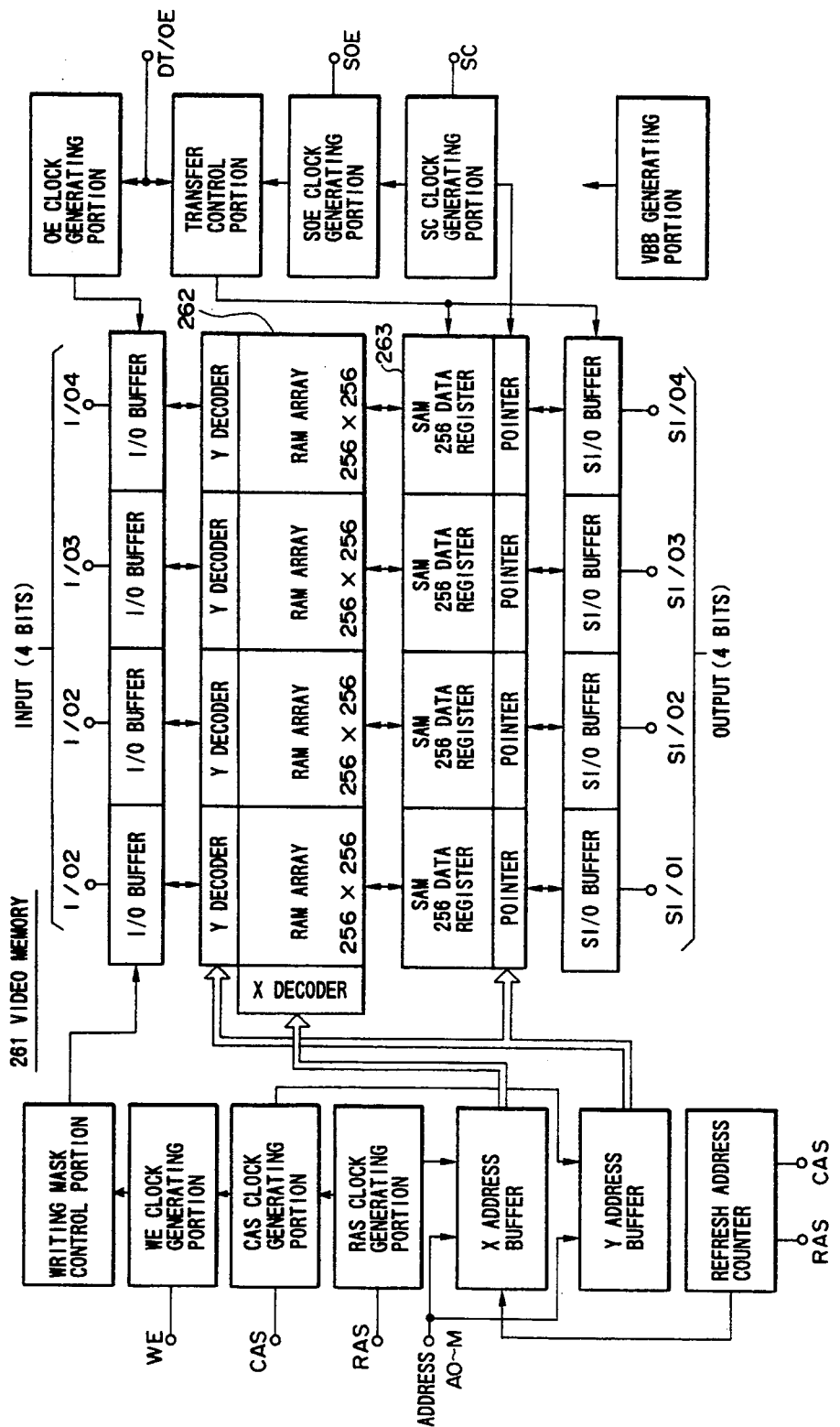
FIG. 11 is a block diagram showing an example of a video memory.

FIG. 11 shows a constructional example of the video memory 261 which is used for the subpicture control.

An RAM is used as a video memory 261 shown in FIG. 11. Four sets of RAM memory arrays 262 each having a memory capacity of 65536 bits (256 rows×256 columns) are provided in the video memory 261. The four sets of memory arrays 262 are accessed and driven in parallel. The real-time writing operation of the subpicture information and the reading operation of the subpicture information which has already been written can be simultaneously and synchronously executed every array 262. Further, in order to allow the reading operation to be executed at a high speed, serial access memories 263 of (one row×256 columns) are provided every array 262.

In the subpicture control using the memory 261, the reducing process of the picture size due to the sampling of the pixels is executed.

Figure 12A:
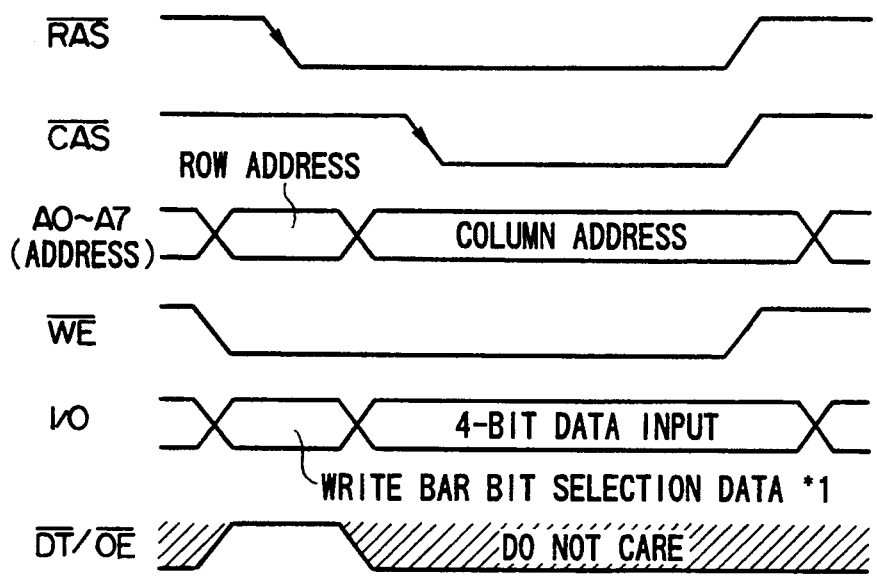
FIG. 12A is a time chart showing the writing operation of the video memory.
Figure 12B:
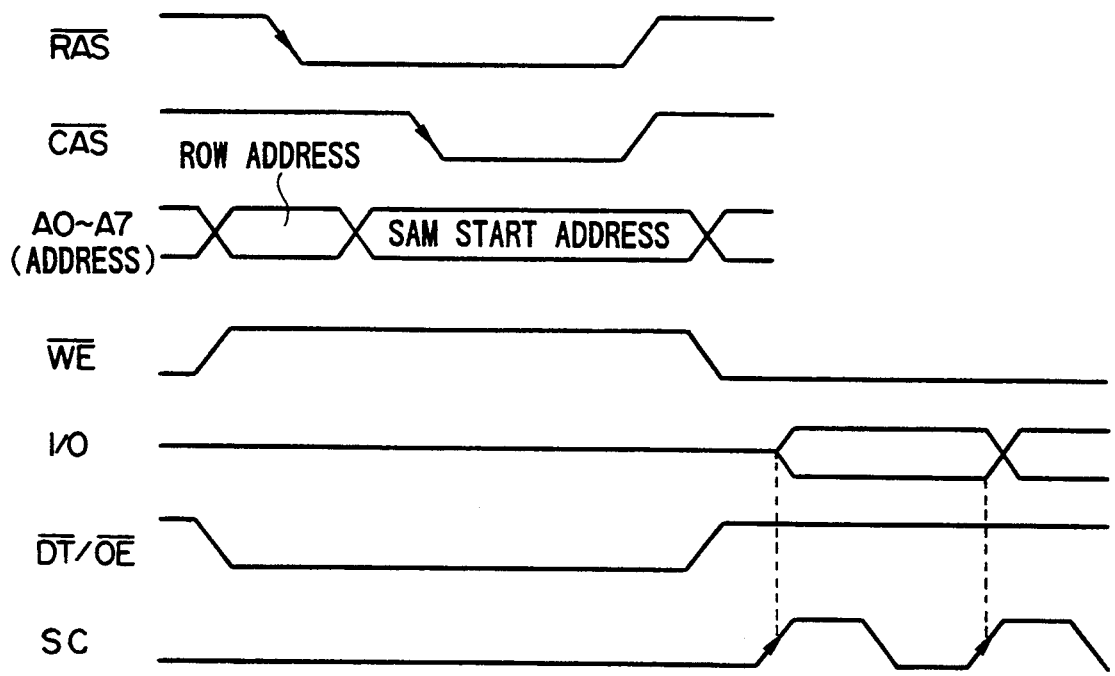
FIG. 12B is a time chart showing the reading operation of the video memory.

FIG. 12A shows the timing for the writing operation into the memory 261. FIG. 12B shows the timing for the reading operation from the memory 261.

The writing operation is executed in the following manner as shown in FIG. 12A.

(1) A row address is specified in response to a falling edge of $\overline{RAS}$. A column address is specified in response to a falling edge of $\overline{CAS}$.

(2) When WE is set to the low active level, 4-bit data is written into the memory in response to the falling edge of $\overline{CAS}$.

The reading operation is executed in the following manner as shown in FIG. 12B.

(1) $\overline{DT/OE}$ is set to the low active level, thereby setting into a data transfer cycle from the RAM memory into the serial access memory.

(2) A read row address is specified in response to the falling edge of $\overline{RAS}$. A read start address in the serial access memory is specified in response to the falling edge of $\overline{CAS}$.

(3) 4-bit data is outputted from the memory in response to a rising edge of the SC cycle.

Figure 13:
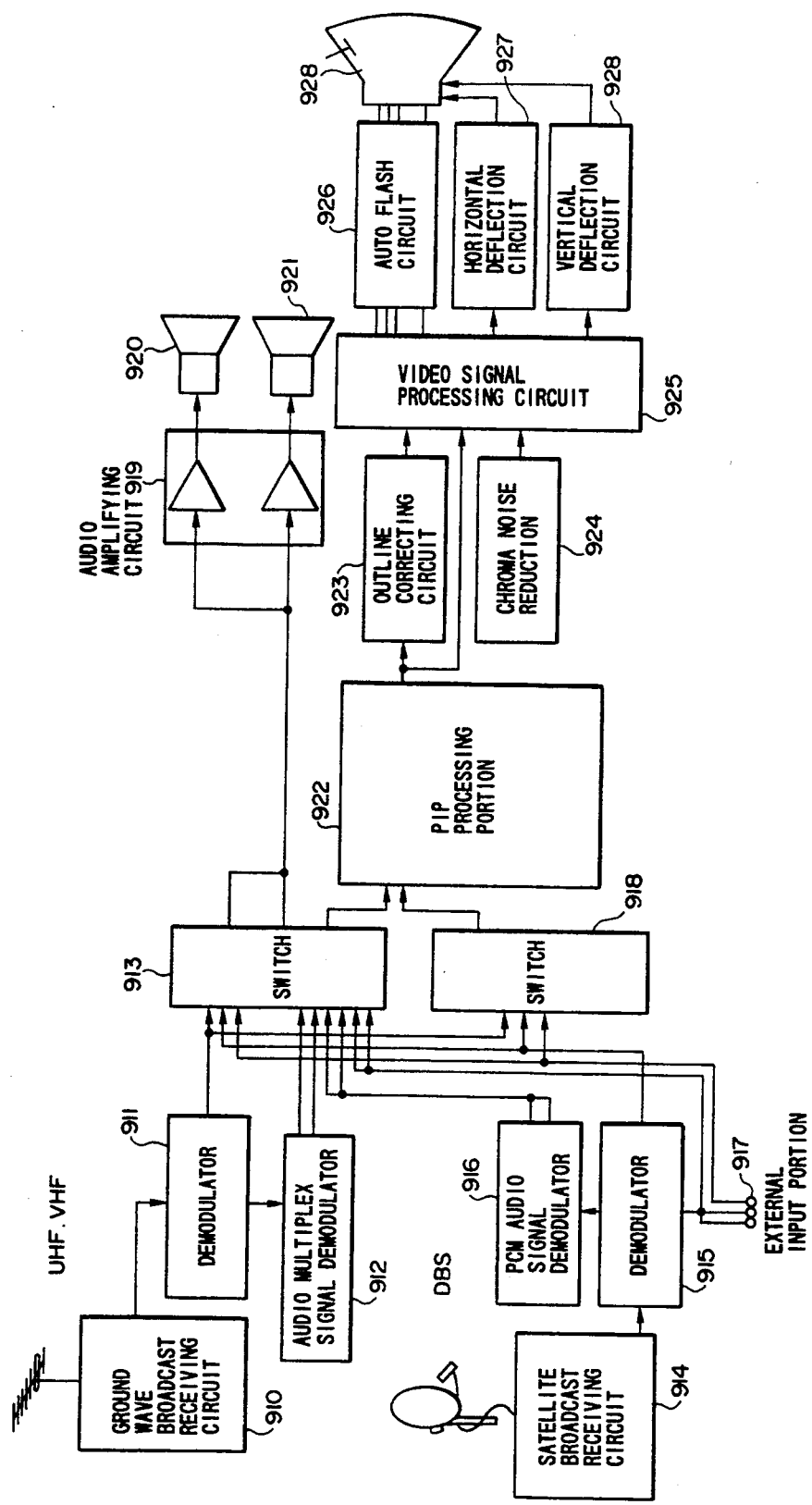
FIG. 13 is a block diagram showing a video signal processing device according to further another embodiment of the invention.

Further another embodiment of the present invention is shown in FIG. 13.

In FIG. 13, reference numeral 910 denotes a ground wave broadcast receiving circuit to receive a broadcast signal by a ground wave such as UHF, VHF, or the like; 911 a demodulator to demodulate the received ground wave broadcast signal into a video signal and an audio signal; 912 an audio multiplex signal demodulator to demodulate an audio multiplex signal; 913 a switch to change over the audio signal; 914 a satellite broadcast receiving circuit to receive a broadcast signal by the satellite broadcast; 915 a demodulator to demodulate the received satellite broadcast signal into a video signal and an audio signal; 916 a PCM audio signal demodulator to demodulate a PCM audio signal; 917 an external input portion to which the video signal and the audio signal are supplied from the outside; 918 a switch to change over the video signal; 919 an audio amplifying circuit; 920 and 921 speakers; 922 a PIP processing portion; 923 an outline correcting circuit; 924 a chroma noise reduction; 925 a video signal processing circuit; 926 an auto flesh circuit; 927 a horizontal deflection circuit; 928 a vertical deflection circuit; and 929 a CRT.

The PIP processing portion 922 corresponds to, for example, the device shown in FIG. 1 excluding the color demodulator 14 and the matrix circuit 15 shown in FIG. 1. The video signal processing circuit 925 corresponds to, for instance, the color demodulator 14 and the matrix circuit 15 shown in FIG. 1.

In this embodiment, one of the video signal in the ground wave broadcast signal and the video signal in the satellite broadcast signal is used as a main video signal mentioned above and the other is used as a sub video signal mentioned above.

Although each of the above embodiments has been described with respect to the case where the invention made by the present inventors has been applied to the PIP system, the invention is not limited to such a case but can be also applied to, for instance, a video system in which a picture is divided into three or more regions and independent video images are displayed in the divided regions or the like.

Figure 14:
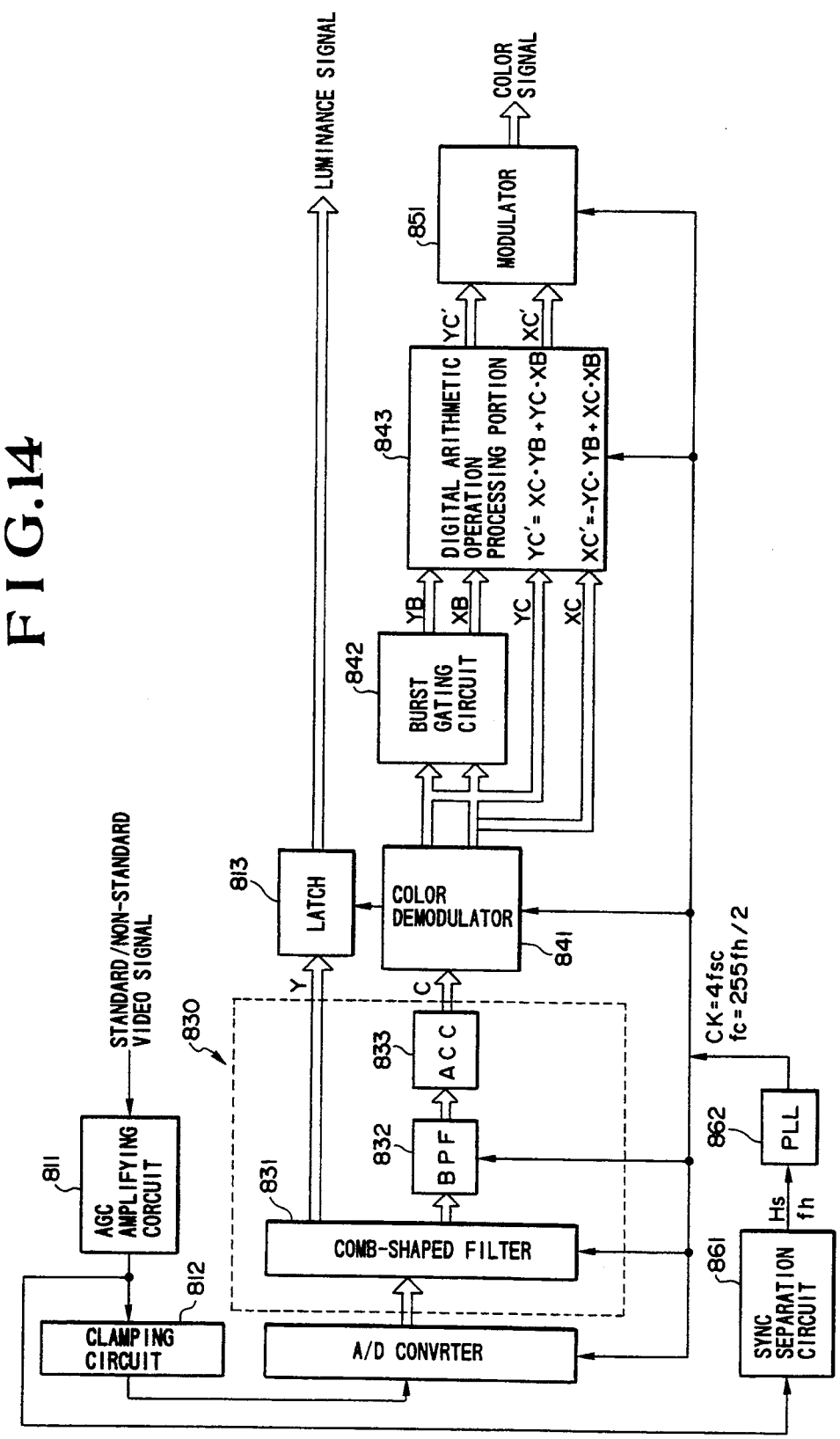
FIG. 14 is a block diagram showing a video signal processing device according to further another embodiment of the invention.

FIG. 14 shows a video signal processing device according to further another embodiment of the present invention.

In FIG. 14, reference numeral 811 denotes an AGC amplifier; 812 a clamping circuit; 813 a latch circuit; 821 an A/D converter; 830 a digital Y/C separation circuit; 841 a digital color demodulator; 842 a burst gating circuit; 843 a digital arithmetic operation processing portion; 851 a modulator; 861 a sync separation circuit; and 862 a PLL (phase locked loop).

The signal shown in FIG. 2 can be also mentioned as an example of the inputted video signal in the embodiment.

The AGC amplifier 811 amplifies the analog inputted video signal to a predetermined amplitude level. The clamping circuit 812 executes a DC reproduction of the inputted video signal. The latch circuit 813 temporarily holds data for timing adjustment. The A/D converter 821 converts the video signal into the digital signal. The digital Y/C separation circuit 830 comprises a comb-shaped filter 831, a BPF (band amplifier) 832, an ACC (automatic color level control circuit) 833, and the like and separates the luminance signal Y and the chrominance signal C from the digital video signal. The digital color demodulator 841 demodulates the color difference signals (color difference signals including the color burst signal) (YB, XB, and YC, XC) from the chrominance signal C by the biaxial demodulation of R-Y and B-Y. The burst gating circuit 842 extracts the color burst signals (YB, XB) which are demodulated by the digital color demodulator 841 every horizontal scan of the video signal. The digital arithmetic operation processing portion 843 executes a correcting process by arithmetic operations to the color difference signals (color difference signals including no color burst signal) (YC, XC) of the chrominance signal on the basis of the color burst signals (YB, XB). The modulator 851 modulates the corrected color difference signals (YC', XC') into the chrominance signals by using the clock CK synchronized with the horizontal sync signal $H_s$ of the inputted video signal. The sync separation circuit 861 separates the vertical and horizontal sync signals from the inputted video signal. The PLL 862 generates the clock CK (subcarrier) of a frequency $4f_{sc}$ ($f_{sc}$=455 $f_h/2$) having a predetermined relation for the frequency $f_h$ of the horizontal sync signal $H_s$ by a VCO (voltage controlled oscillator) which is controlled synchronously with the horizontal sync signal $H_s$.

Figure 15:
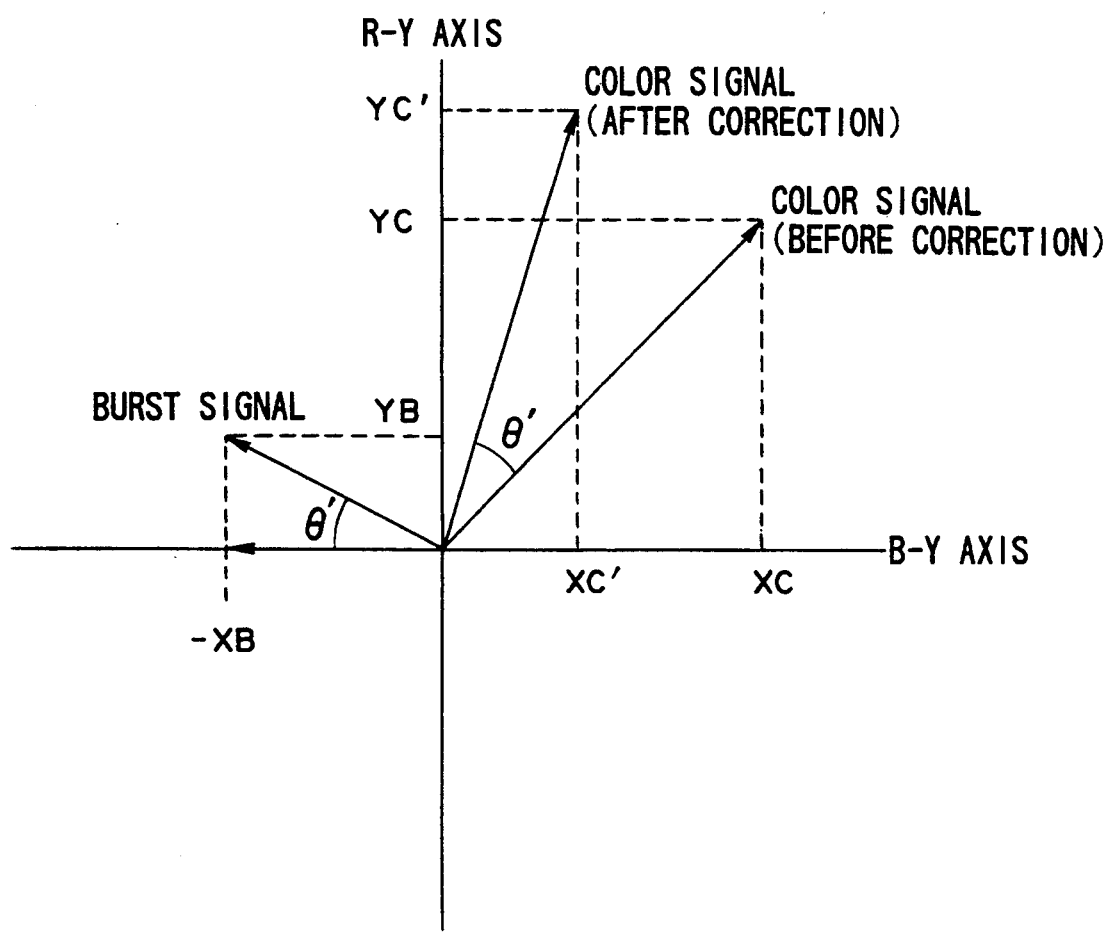
FIG. 15 is a diagram showing an example of arithmetic operating processes.
Figure 16:
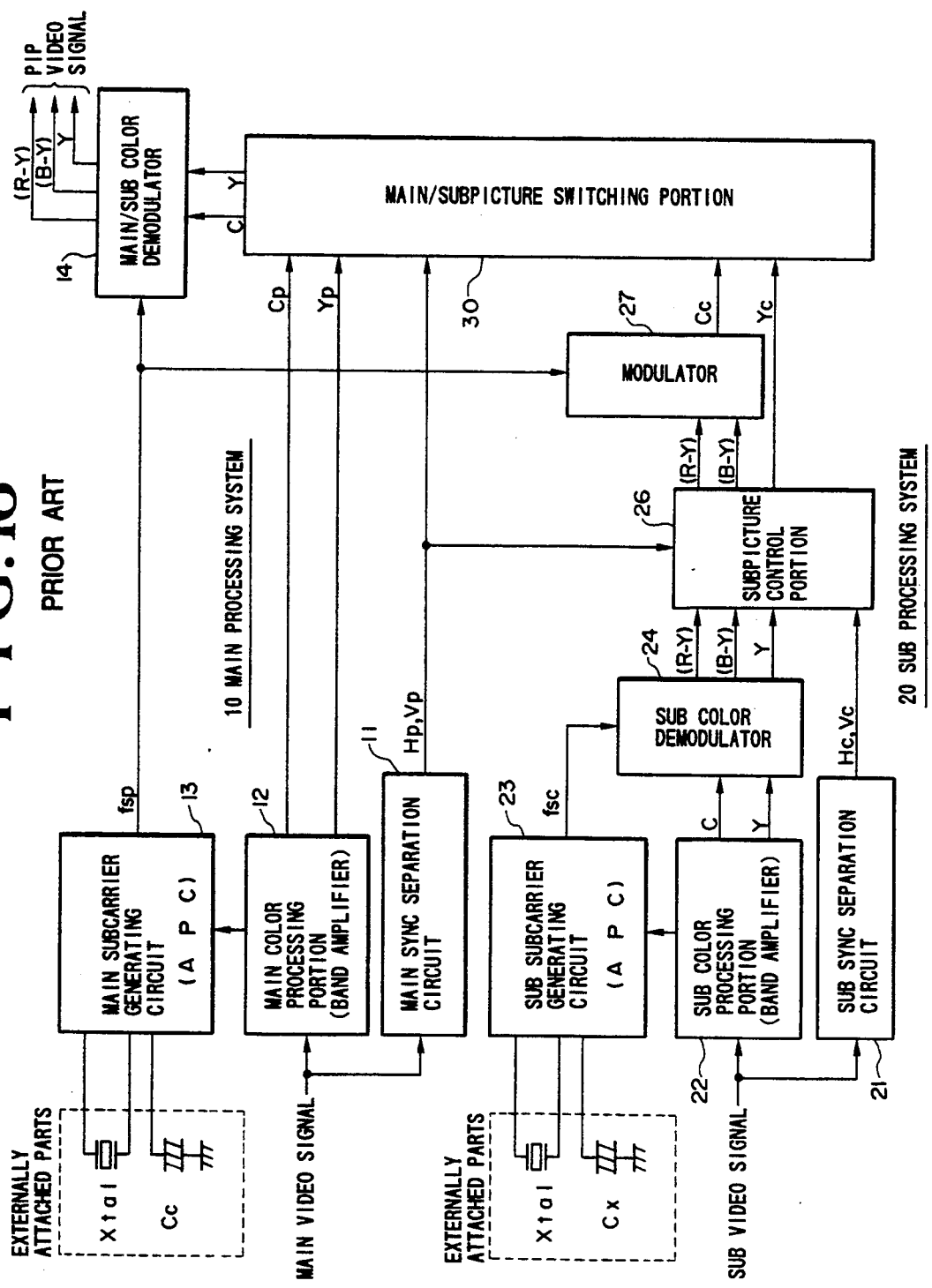
FIG. 16 is a block diagram showing an example of a conventional video signal processing device.
Figure 17:
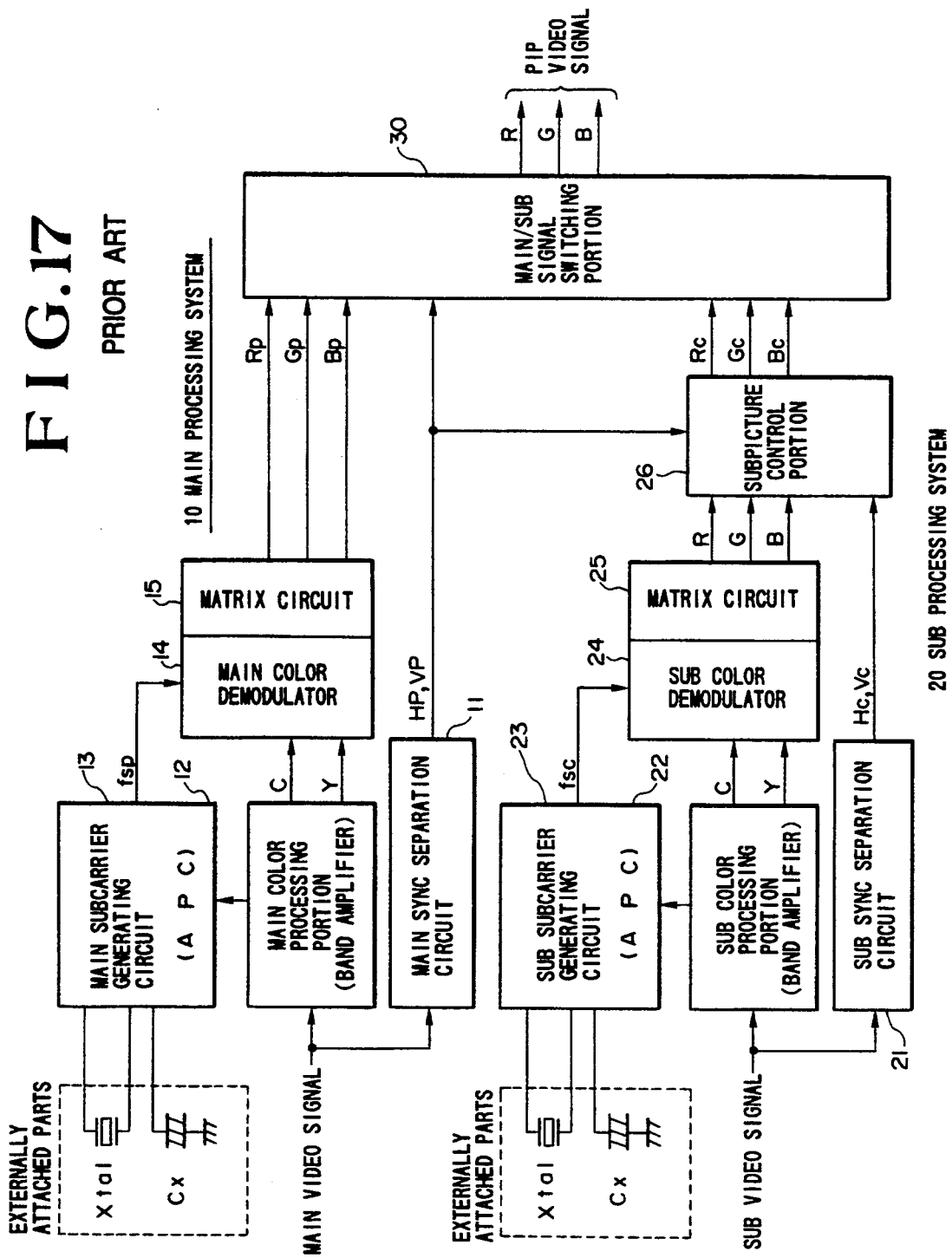
FIG. 17 is a block diagram showing another example of a conventional video signal processing device.

FIG. 15 shows the principle of the correcting process which is executed by the digital arithmetic operation processing portion 843.

As shown in the diagram, in the correcting process, $\sin\theta'$ and $\cos\theta'$ regarding a phase difference $\theta'$ between the color burst signal and the clock CK are obtained on the basis of the demodulated color burst signals YB and XB (R-Y axis component value, B-Y axis component value). The obtained $\sin\theta'$ and $\cos\theta'$ are held until $\sin\theta'$ and $\cos\theta'$ in the next horizontal synchronizing interval are obtained. Further, an arithmetic operating process to mathematically correct the demodulated color difference signals YC and XC is executed so that they are corrected to the color difference signals YC' and XC' such as to eliminate the phase difference $\theta'$. That is, the digital arithmetic operation processing portion 843 executes an arithmetic operating process to the color difference signals YC and XC on the basis of the color burst signals YB and XB in a manner such that the color difference signals YC and XC are converted into the corrected color difference signals YC' and XC' which are substantially the same as the color difference signals which are obtained in the case where the chrominance signal is demodulated on the basis of the clock (subcarrier) synchronized with the color burst signal included in the inputted video signal.

The following equations are shown as an example of the arithmetic equations of the correcting process which is executed by the digital arithmetic operation processing portion 843.

$$YC = XC \cdot YB + YC \cdot XB \\ XC = -YC \cdot YB + XC \cdot XB \quad \Big) \quad (5)$$

$$YC = XC \sin\theta' + Y \cos\theta' \\ XC = -YC \sin\theta' + XC \cos\theta' \quad \Big) \quad (6)$$

$$\sin\theta' = YB \\ \cos\theta' = XB \quad \Big) \quad (7)$$

The arithmetic operations shown in the equations (5) to (7) can be executed by hardware processes by using arithmetic operating circuits such as adders, multipliers, or the like or by software processes by using a DSP (digital signal processor) or the like.

The digital arithmetic operation processing portion 843 can be constructed, for instance, in a manner similar to the construction shown in FIG. 8.

In the above video signal processing device, the digital conversion of the analog inputted video signal, the Y/C separation from the digital video signal, and the color demodulation of the separated chrominance signal are first respectively executed on the basis of the clock CK which is synchronized with the horizontal sync signal $H_s$ of the video signal, so that the digital color signal process can be stably executed without causing a jitter in the horizontal direction or the like.

In addition, by executing the correction by the digital arithmetic operating process to the demodulated color signals (YC, XC) from the chrominance signal on the basis of the color burst signals (YB, XB) which are extracted every horizontal scan of the video signal, even when there is a phase error between the clock CK which is generated synchronously with the horizontal sync signal $H_s$ of the inputted video signal and the color burst signal of the inputted video signal, the color demodulation error which is caused due to the phase error can be automatically corrected on the basis of the phase difference $\theta$ shown by the color burst signals (YB, XB). A reference phase which is used to execute such correction is updated every horizontal period.

Thus, even for any one of the standard and non-standard inputted video signals, the accurate and stable color reproducing process can be executed by using only a digital type processing circuit without judging whether the inputted video signal is of the standard type or the non-standard type.

The color signals (color difference signals) YC' and XC' which are corrected by the digital arithmetic operation processing portion 843 can be also directly sent to the color display system and displayed. In the embodiment shown in FIG. 1, however, those color signals may be modulated into the chrominance signals of the standard color system by the modulator 851 and outputted. Thus, even when the inputted video signal is any one of the standard color signal and the non-standard color signal, the chrominance signals which are unified to the standard color signal are always obtained. The corrected color signals YC' and XC' can be also modulated to the chrominance signals by the clock CK. It is also possible to construct in a manner such that the clock is generated on the basis of the color burst signal included in the inputted video signal and the corrected color signals YC' and XC' are modulated into the chrominance signals by the clock.

Further, as mentioned above, according to the device of the present invention, both of the standard and non-standard systems can be processed by the single digital processing system. Therefore, there is no need to individually prepare the processing circuits for both of the standard and non-standard systems and there is also no need to judge whether the inputted video signal is of the standard system or the non-standard system.

Therefore, the accurate and stable color reproduction can be executed from any one of the standard and non-standard inputted video signals without making the construction complicated and making the scale large.

The embodiment shown in FIG. 14 can be also modified by, for instance, the following methods. That is, a circuit corresponding to the color killer control portion 50 in FIG. 6 can be also provided in place of the ACC 833 in FIG. 14.

Although the above embodiment shown in FIG. 14 has been described with respect to the case where the invention made by the present inventors was applied to a video apparatus such as television receiver, video reproducing apparatus, or the like, the invention is not limited to such a case but can be also applied to, for instance, a video processing system using a computer.

Although the invention made by the present inventors has specifically been described on the basis of the preferred embodiments, the present invention is not limited to the foregoing embodiments but many modifications and variations are possible within the spirit and scope of the appended claims of the invention.

According to the present invention as described above, there is obtained an effect such that the color reproducing processes of the video signals of a plurality of systems can be accurately performed without providing the subcarrier generating circuit for color demodulation for every system, and a video synthesizing system such as a PIP system can be also constructed at low costs and a small size. According to the invention, on the other hand, there is obtained an effect such that the accurate and stable color reproduction can be executed even from any one of the standard and non-standard inputted video signals without making the construction complicated or making the scale large.

"Fourth Generation PIP System Application Note", September, 1992, published by Semiconductor and IC Div., Hitachi Ltd., implements an example of a video signal processing device according to the present invention.

We claim:

1. A video signal processing device comprising:
   means for extracting a first color burst signal from a first video signal;
   means for generating a first subcarrier in synchronism with said first color burst signal extracted from said first video signal;
   means for extracting a second chrominance signal and a second color burst signal from a second video signal;
   means for demodulating said second chrominance signal and said second color burst signal on the basis of said first subcarrier to obtain a demodulated second color signal and a demodulated second color burst signal; and
   operating means for performing operation process of said demodulated second color signal on the basis of the demodulated second color burst signal in a manner such that the demodulated second color signal is converted into a corrected color signal which is substantially the same as an imaginal second color signal which is obtained on the assumption that the second chrominance signal is demodulated on the basis of a second subcarrier synchronized with the second color burst signal extracted from the second video signal.

2. A device according to claim 1, further comprising:
   means for extracting a first chrominance signal from said first video signal; and
   means for demodulating said first chrominance signal on the basis of said first subcarrier to obtain a demodulated first color signal.

3. A device according to claim 2, further comprising means for synthesizing said corrected color signal and said first color signal.

4. A device according to claim 1, wherein said means for generating the first subcarrier includes a single quartz-crystal oscillator.

5. A device according to claim 1, wherein said operating means executes operation which is substantially expressed by the following equations:

$$XC' = -YC \cdot YB + XC \cdot XB$$

$$YC' = XC \cdot YB + YC \cdot XB$$

where,

XB: Value of a first component indicated by said demodulated second color burst signal
YB: Value of a second component indicated by said demodulated second color burst signal
XC: Value of a first component indicated by said demodulated second color signal
YC: Value of a second component indicated by said demodulated second color signal
XC': Value of a first component indicated by said corrected color signal
YC': Value of a second component indicated by said corrected color signal.

6. A device according to claim 1, wherein said demodulated second color burst signal is updated every horizontal period of said second video signal.

7. A device according to claim 1, wherein said operating means comprises:
averaging means for sequentially averaging said demodulated second color burst signals obtained for a plurality of horizontal periods, every period that is N (N is an integer of 1 or more) times as long as said horizontal period; and
means for performing operation process of said demodulated second color signal on the basis of the signal averaged by said averaging means in a manner such that said demodulated second color signal is converted into said corrected color signal.

8. A device according to claim 1, further comprising:
holding means for sequentially holding phase information of said second color burst signal every horizontal period;
comparing means for comparing the phase information held by said holding means with phase information obtained at the next horizontal period; and
means for making said corrected color signal ineffective, in response to the result of the comparison by said comparing means, when a phase difference between the two second color burst signals derived for two continuous horizontal periods is larger than a predetermined value.

9. A device according to claim 1, further comprising:
comparing means for comparing an amplitude of said second color burst signal with a predetermined value; and
means for making said corrected color signal ineffective, in response to the result of the comparison by said comparing means, when said amplitude is smaller than said predetermined value.

10. A device according to claim 1, further comprising:
receiving means for obtaining the first video signal from a first broadcast signal; and
receiving means for obtaining the second video signal from a second broadcast signal.

11. A video signal processing device comprising:
an A/D converter for converting an inputted video signal into a digital video signal;
means for generating a clock synchronized with a horizontal synchronizing signal included in said inputted video signal;
means for extracting a chrominance signal and a color burst signal from said digital video signal;
means for demodulating said chrominance signal and said color burst signal on the basis of the clock to obtain a demodulated color signal and a demodulated color burst signal; and
operating means for performing operation process of said demodulated color signal on the basis of said demodulated color burst signal in a manner such that said demodulated color signal is converted into a corrected color signal which is substantially the same as a second color signal which is obtained in the case where said chrominance signal is demodulated on the basis of a clock synchronized with a color burst signal included in said inputted video signal.

12. A device according to claim 11, wherein said operating means executes operation which is substantially expressed by the following equations:

$$XC' = -YC \cdot YB + XC \cdot XB$$

$$YC' = XC \cdot YB + YC \cdot XB$$

where,
XB: Value of a first component indicated by said demodulated color burst signal
YB: Value of a second component indicated by said demodulated color burst signal
XC: Value of a first component indicated by said demodulated color signal
YC: Value of a second component indicated by said demodulated color signal
XC': Value of a first component indicated by said corrected color signal
YC': Value of a second component indicated by said corrected color signal.

13. A device according to claim 11, wherein said demodulated color burst signal is updated every horizontal period of said video signal.

14. A device according to claim 11, wherein said operating means comprises:
averaging means for sequentially averaging said demodulated color burst signals obtained for a plurality of horizontal periods, every period that is N (N is an integer of 1 or more) times as long as said horizontal period; and
means for performing operation process of said demodulated color signal on the basis of the signal averaged by said averaging means in a manner such that said demodulated color signal is converted into said corrected color signal.

15. A device according to claim 11, further comprising:
holding means for sequentially holding phase information of said color burst signal every horizontal period;
comparing means for comparing the phase information held in said holding means with phase information obtained at the next horizontal period; and
means for making said corrected color signal ineffective, in response to the result of the comparison by said comparing means, when a phase difference between the two color burst signals derived for two continuous horizontal periods is larger than a predetermined value.

16. A device according to claim 11, further comprising:
comparing means for comparing an amplitude of said color burst signal with a predetermined value; and
means for making said corrected color signal ineffective, in response to the result of the comparison by said comparing means, when said amplitude is smaller than said predetermined value.

17. A device according to claim 11, further comprising:

modulating means for modulating said corrected color signal into a chrominance signal by a clock generated on the basis of the color burst signal included in said inputted video signal.

18. A device according to claim 11, further comprising:
modulating means for modulating said corrected color signal into a chrominance signal by said clock.

19. A video signal processing device comprising:
means for receiving a first signal indicative of a first component of a color burst signal;
means for receiving a second signal indicative of a second component of said color burst signal;
means for receiving a third signal indicative of a first component of a color signal;
means for receiving a fourth signal indicative of a second component of said color signal; and
operating means for performing operation process of said first to fourth signals to obtain a fifth signal indicative of a first component of a corrected color signal and a sixth signal indicative of a second component of said corrected color signal,
wherein said operating means executes operation which is substantially expressed by the following equations:

$$XC' = -YC \cdot YB + XC \cdot XB$$

$$YC' = XC \cdot YB + YC \cdot XB$$

where,
XB: Value indicated by said first signal
YB: Value indicated by said second signal
XC: Value indicated by said third signal
YC: Value indicated by said fourth signal
XC': Value indicated by said fifth signal
YC': Value indicated by said sixth signal.

20. A device signal processing method comprising:
a step of extracting a first color burst signal from a first video signal;
a step of generating a first subcarrier in synchronism with said first color burst signal extracted from said first video signal;
a step of extracting a second chrominance signal and a second color burst signal from a second video signal;
a step of demodulating said second chrominance signal and said second color burst signal on the basis of said first subcarrier to obtain a demodulated second color signal and a demodulated second color burst signal; and
an operating step of performing operation process of said demodulated second signal on the basis of said demodulated second color burst signal in a manner such that said demodulated second color signal is converted into a corrected color signal which is substantially the same as an imaginal second color signal which is obtained on the assumption that said second chrominance signal is demodulated on the basis of a second subcarrier synchronized with the second color burst signal extracted from said second video signal.

21. A method according to claim 20, further comprising:
a step of extracting a first chrominance signal from said first video signal; and
a step of demodulating said first chrominance signal and said first color burst signal on the basis of said first subcarrier to obtain a demodulated first color signal.

22. A method according to claim 21, further comprising:
a step of synthesizing said corrected color signal and said first color signal.

23. A method according to claim 20, wherein said step of generating the first subcarrier includes a step of using a single quartz-crystal oscillator.

24. A method according to claim 20, wherein said operating step includes a step of executing operation which is substantially expressed by the following equations:

$$XC' = -YC \cdot YB + XC \cdot XB$$

$$YC' = XC \cdot YB + YC \cdot XB$$

where,
XB: Value of a first component indicated by said demodulated second color burst signal
YB: Value of a second component indicated by said demodulated second color burst signal
XC: Value of a first component indicated by said demodulated second color signal
YC: Value of a second component indicated by said demodulated second color signal
XC': Value of a first component indicated by said corrected color signal
YC': Value of a second component indicated by said corrected color signal.

25. A method according to claim 20, wherein said demodulated second color burst signal is updated every horizontal period of said second video signal.

26. A method according to claim 20, wherein said operating step comprises:
an averaging step of sequentially averaging said demodulated second color burst signals obtained for a plurality of horizontal periods, every period which is N (N is an integer of 1 or more) times as long as said horizontal period; and
a step of executing operation process of said demodulated second color signal on the basis of the signal averaged by said averaging step in a manner such that said demodulated second color signal is converted into said corrected color signal.

27. A method according to claim 20, further comprising:
a step of sequentially holding phase information of said second color burst signal every horizontal period;
a comparing step of comparing the phase information held by said holding step with phase information obtained in the next horizontal period; and
a step for making the corrected color signal ineffective, in response to the result of the comparison by said comparing step, when a phase difference between said two second color burst signals obtained for two continuous horizontal periods is larger than a predetermined value.

28. A method according to claim 20, further comprising:
a comparing step of comparing an amplitude of said second color burst signal with a predetermined value; and
a step of making the corrected color signal ineffective, in response to the result of the comparison by said comparing step, when said amplitude is smaller than said predetermined value.

29. A method according to claim 20, further comprising:
a receiving step of obtaining said first video signal from a first broadcast signal; and
a receiving step of obtaining said second video signal from a second broadcast signal.

30. A video signal processing method comprising:
a step of converting an inputted video signal into a digital video signal;
a step of generating a clock synchronized with a horizontal synchronizing signal included in said inputted video signal;
a step of extracting a chrominance signal and a color burst signal from said digital video signal;
a step of demodulating said chrominance signal and said color burst signal on the basis of said clock to obtain a demodulated color signal and a demodulated color burst signal; and
an operating step of performing operation process of said demodulated color signal on the basis of said demodulated color burst signal in a manner such that said demodulated color signal is converted into a corrected color signal which is substantially the same as a second color signal which is obtained in the case where said chrominance signal is demodulated on the basis of a clock synchronized with a color burst signal included in said inputted video signal.

31. A method according to claim 30, wherein said operating step includes a step of executing operation which is substantially expressed by the following equations:

$$XC' = -YC \cdot YB + XC \cdot XB$$

$$YC' = XC \cdot YB + YC \cdot XB$$

where,
XB: Value of a first component indicated by said demodulated color burst signal
YB: Value of a second component indicated by said demodulated color burst signal
XC: Value of a first component indicated by said demodulated color signal
YC: Value of a second component indicated by said demodulated color signal
XC': Value of a first component indicated by said corrected color signal
YC': Value of a second component indicated by said corrected color signal.

32. A method according to claim 30, wherein said demodulated color burst signal is updated every horizontal period of said video signal.

33. A method according to claim 30, wherein said operating step comprises:
an averaging step of sequentially averaging said demodulated color burst signals obtained for a plurality of horizontal periods, every period which is N (N is an integer of 1 or more) times as long as said horizontal period; and
a step of executing an arithmetic operation process of said demodulated color signal on the basis of the signal averaged by said averaging step in a manner such that said demodulated color signal is converted into said corrected color signal.

34. A method according to claim 30, further comprising:
a step of sequentially holding phase information of said color burst signal every horizontal period;
a comparing step of comparing the phase information held in said holding step with phase information obtained in the next horizontal period; and
a step of making the corrected color signal ineffective, in response to the result of the comparison by said comparing step, when a phase difference between said two color burst signals obtained for two continuous horizontal periods is larger than a predetermined value.

35. A method according to claim 30, further comprising:
a comparing step of comparing an amplitude of said color burst signal with a predetermined value; and
a step of making the corrected color signal ineffective, in response to the result of the comparison by said comparing step, when said amplitude is smaller than said predetermined value.

36. A method according to claim 30, further comprising:
a modulating step of modulating the corrected color signal into a chrominance signal by a clock generated on the basis of the color burst signal included in said inputted video signal.

37. A method according to claim 30, further comprising:
a modulating step of modulating the corrected color signal into a chrominance signal by said clock.

38. A video signal processing method comprising:
a step of receiving a first signal indicative of a first component of a color burst signal;
a step of receiving a second signal indicative of a second component of said color burst signal;
a step of receiving a third signal indicative of a first component of a color signal;
a step of receiving a fourth signal indicative of a second component of said color signal; and
an operating step of performing operation process of said first to fourth signals to obtain a fifth signal indicative of a first component of a corrected color signal and a sixth signal indicative of a second component of said corrected color signal,
wherein said operating step includes a step of executing operation which is substantially expressed by the following equations:

$$XC' = -YC \cdot YB + XC \cdot XB$$

$$YC' = XC \cdot YB + YC \cdot XB$$

where,
XB: Value indicated by said first signal
YB: Value indicated by said second signal
XC: Value indicated by said third signal
YC: Value indicated by said fourth signal
XC': Value indicated by said fifth signal
YC': Value Indicated by said sixth signal.

39. A video signal processing device comprising:
a circuit for extracting a first color burst signal from a main video signal corresponding to a main picture;
a circuit for generating a first subcarrier in synchronism with the first color burst signal extracted from the main video signal, the circuit for generating a first subcarrier including a single quartz-crystal oscillator;

a circuit for extracting a second chrominance signal and a second color burst signal from a sub video signal corresponding to a sub picture to be superimposed onto the main picture;

a circuit for demodulating the second chrominance signal and the second color burst signal on the basis of the first subcarrier to obtain a demodulated second color signal and a demodulated second color burst signal; and an operating circuit for performing an operation on the demodulated second color signal on the basis of the demodulated second color burst signal such that the demodulated second color signal is converted into a corrected color signal which is substantially the same as an imaginal second color signal obtained on the assumption that the second chrominance signal is demodulated on the basis of a second subcarrier synchronized with the second color burst signal extracted from the sub video signal.

40. A device according to claim 39, further comprising:

a circuit for extracting a first chrominance signal from the main video signal; and a circuit for demodulating the first chrominance signal on the basis of the first subcarrier to obtain a demodulated first color signal.

41. A device according to claim 40, further comprising: a circuit for synthesizing the corrected color signal and the first color signal.

42. A device according to claim 39, wherein the operating circuit performs an operation which is substantially expressed by the following equations:

$$XC' = -YC \cdot YB + XC \cdot XB$$

$$YC' = XC \cdot YB + YC \cdot XB$$

where

XB: value of a first component indicated by the demodulated second color burst signal, YB: value of a second component indicated by the demodulated second color burst signal, XC: value of a first component indicated by the demodulated second color signal, YC: value of a second component indicated by the demodulated second color signal, XC': value of a first component indicated by the corrected color signal, and YC': value of a second component indicated by the corrected color signal.

43. A device according to claim 39, wherein the demodulated second color burst signal is updated every horizontal period of the sub video signal.

44. A device according to claim 39, wherein the operating circuit comprises:

an averaging circuit for sequentially averaging the demodulated second color burst signal obtained for a plurality of horizontal periods, every period that is N (N is an integer of 1 or more) times as long as the horizontal period; and a circuit for performing an operation on the demodulated second color signal on the basis of the signal averaged by the averaging circuit such that the demodulated second color signal is converted into the corrected color signal.

45. A device according to claim 39, further comprising:

a memory for sequentially holding phase information of the second color burst signal every horizontal period;

a comparing circuit for comparing the phase information held by the memory with phase information obtained at the next horizontal period; and a circuit for making the corrected color signal ineffective, in response to the result of the comparison by the comparing circuit, when a phase difference between the two second color burst signals derived for two continuous horizontal periods is larger than a predetermined value.

46. A device according to claim 39, further comprising:

a comparing circuit for comparing an amplitude of the second color burst signal with a predetermined value; and a circuit for making the corrected color signal ineffective, in response to the result of the comparison by the comparing circuit, when the amplitude is smaller than the predetermined value.

47. A device according to claim 39, further comprising:

a receiving circuit for obtaining the main video signal from a first broadcast signal; and a receiving circuit for obtaining the sub video from a second broadcast signal.

48. A video signal processing device comprising:

a first receiving circuit for receiving a first broadcast signal;

a first demodulator for demodulating an output of the first receiving circuit to output a first video signal;

a second receiving circuit for receiving a second broadcast signal;

a second demodulator for demodulating an output of the second receiving circuit to output a first video signal;

a switching circuit for switching between a first state in which the first video signal is outputted as a main video signal from the switching circuit and the second video signal is outputted as a sub video signal from the switching circuit and a second state in which the first video signal is outputted as the sub video signal from the switching circuit. and the second video signal is outputted as the main video signal from the switching circuit;

a circuit for extracting a first luminance signal, a first chrominance signal, and a first color burst signal from the main video signal;

a circuit for generating a first subcarrier in synchronism with the first color burst signal extracted from the main video signal;

a circuit for extracting a second luminance signal, a second chrominance signal, and a second color burst signal from the sub video signal;

a circuit for demodulating the second chrominance signal and the second color burst signal on the basis of the first subcarrier to obtain a demodulated second color signal and a demodulated second color burst signal;

an operating circuit for performing an operation on the demodulated second color signal on the basis of the demodulated second color burst signal such that the demodulated second color signal is converted into a corrected color signal which is substantially the same as an imaginal second color signal obtained on the assumption that the second chrominance signal is demodulated on the basis of a second subcarrier synchronized with the second color burst signal extracted from the sub video signal;

a circuit for outputting a third video signal based on the first luminance signal, the first chrominance signal, the second chrominance signal, and the corrected color signal, wherein the third video signal corresponds to a picture to be obtained by superimposing a subpicture corresponding to the sub video signal into a main picture corresponding to the main video signal; and a CRT for displaying an image corresponding to the third video signal.

49. A device according to claim 48, wherein the circuit for generating a first subcarrier includes a single quartz-crystal oscillator.

50. A device according to claim 48, wherein the operating circuit performing an operation which is substantially expressed by the following equations:

$$XC' = -YC \bullet YB + XC \bullet XB$$

$$YC' = XC \bullet YB + YC \bullet XB$$

where

XB: value of a first component indicated by the demodulated second color burst signal, YB: value of a second component indicated by the demodulated second color burst signal, XC: value of a first component indicated by the demodulated second color signal, YC: value of a second component indicated by the demodulated second color signal, XC': value of a first component indicated by the corrected color signal, and YC': value of a second component indicated by the corrected color signal.

51. A device according to claim 48, wherein the first receiving circuit includes a receiving circuit for receiving a ground wave broadcast as the first broadcast signal, and the second receiving circuit includes a receiving circuit for receiving a satellite broadcast as the second broadcast signal.

52. A device according to claim 48, further comprising:

a third demodulator for demodulating the output of the first receiving circuit to output a first audio signal;

a fourth demodulator for demodulating the output of the second receiving circuit to output a second audio signal;

an audio signal switching circuit for switching between a first state in which one of the first and second audio signals is outputted from the audio signal switching circuit and a second state in which the other of the first and second audio signals is outputted from the audio signal switching circuit; and a speaker for generating a sound corresponding to an output of the audio signal switching circuit.

* * * * *